(12) United States Patent
Miyano

(10) Patent No.: US 8,947,789 B2
(45) Date of Patent: Feb. 3, 2015

(54) IMAGING LENS AND IMAGING APPARATUS

(71) Applicant: FUJIFILM Corporation, Tokyo (JP)

(72) Inventor: Hitoshi Miyano, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/029,214

(22) Filed: Sep. 17, 2013

(65) Prior Publication Data

US 2014/0015999 A1    Jan. 16, 2014

Related U.S. Application Data

(63) Continuation of application No. PCT/JP2012/001822, filed on Mar. 15, 2012.

(30) Foreign Application Priority Data

Mar. 18, 2011   (JP) ................................ 2011-060039

(51) Int. Cl.
  *G02B 9/34*   (2006.01)
  *G02B 13/18*  (2006.01)
  *G02B 13/04*  (2006.01)
  *G02B 13/06*  (2006.01)
  *G02B 23/24*  (2006.01)

(52) U.S. Cl.
  CPC  *G02B 13/04* (2013.01); *G02B 9/34* (2013.01); *G02B 13/06* (2013.01); *G02B 23/243* (2013.01)
  USPC ............................. 359/715; 359/754; 359/771

(58) Field of Classification Search
  CPC .............. G02B 9/00; G02B 9/34; G02B 9/58; G02B 9/62; G02B 13/001; G02B 13/0015; G02B 13/0045; G02B 13/006; G02B 21/02

USPC ......... 359/362, 368, 656–661, 745–746, 749, 359/752, 754, 763, 770, 771, 781–783, 713, 359/715

See application file for complete search history.

(56) References Cited

U.S. PATENT DOCUMENTS

| 3,883,231 | A | * | 5/1975 | Koizumi .................... 359/660 |
| 4,279,477 | A | * | 7/1981 | Tojo .......................... 359/660 |
| 5,175,650 | A | | 12/1992 | Takayama et al. |
| 5,828,498 | A | | 10/1998 | Sekiya et al. |
| 6,994,668 | B2 | * | 2/2006 | Miyano ..................... 600/176 |
| 2004/0125469 | A1 | | 7/2004 | Miyano |
| 2008/0249367 | A1 | | 10/2008 | Miyano |
| 2010/0305405 | A1 | | 12/2010 | Miyano |

FOREIGN PATENT DOCUMENTS

| JP | 63-261213 | 10/1988 |
| JP | 2-293709  | 12/1990 |

(Continued)

OTHER PUBLICATIONS

International Search Report, PCT/JP2012/001822, Jun. 26, 2012.

*Primary Examiner* — Thong Nguyen
(74) *Attorney, Agent, or Firm* — Young & Thompson

(57) ABSTRACT

An imaging lens has a negative first-lens, a first-cemented-lens of a second-lens and a third-lens, a stop, a positive fourth-lens, and a second-cemented-lens of a fifth-lens and a sixth-lens in this order from an object-side. The first-lens has a plano-concave or meniscus shape with a concave image-side surface. One of the second-lens and the third-lens is a positive lens and the other one is a negative lens. An object-side surface of the fourth-lens is a flat surface or a surface with a curvature radius having an absolute value greater than that of its image-side surface. One of the fifth-lens and the sixth-lens is a positive lens and the other one is a negative lens.

5 Claims, 19 Drawing Sheets

(56) References Cited

FOREIGN PATENT DOCUMENTS

| JP | 8-122634 | 5/1996 |
| JP | 2004-145256 | 5/2004 |
| JP | 2004-205779 | 7/2004 |
| JP | 2008-257108 | 10/2008 |
| JP | 2008-257109 | 10/2008 |
| JP | 2010-276923 | 12/2010 |

* cited by examiner

EXAMPLE 1

EXAMPLE 2

EXAMPLE 5

EXAMPLE 6

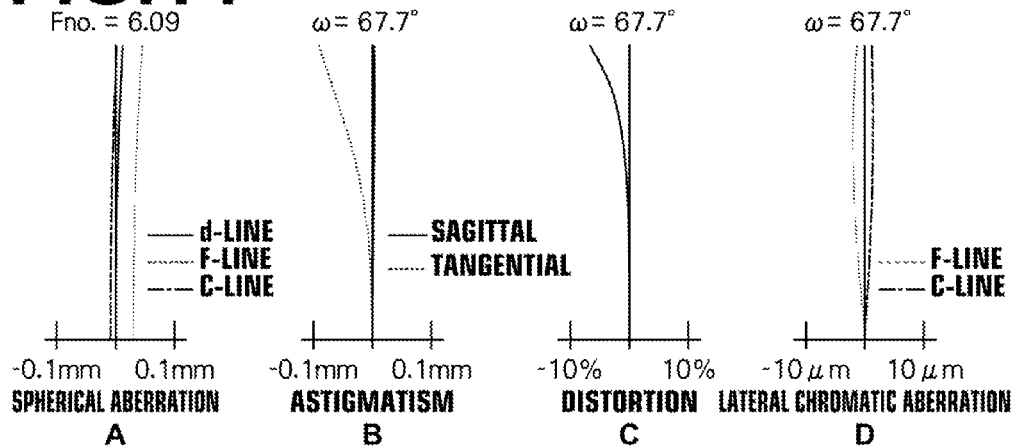
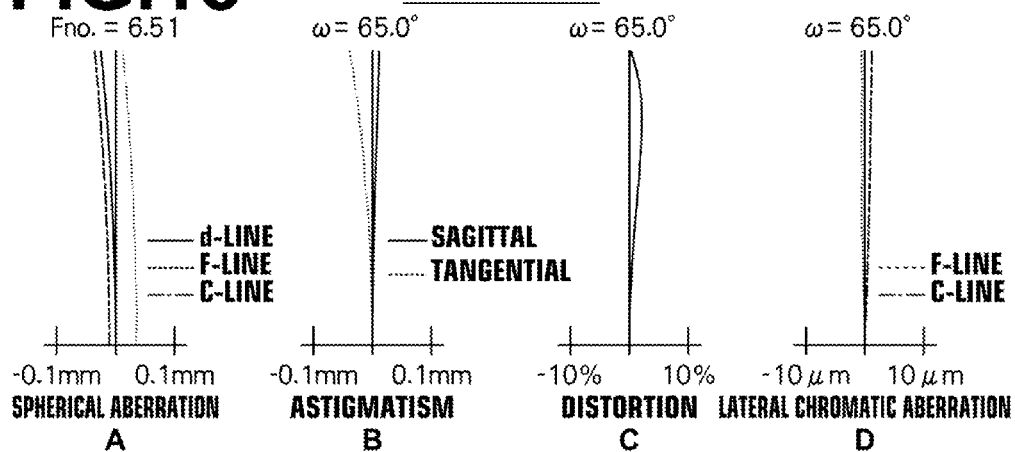
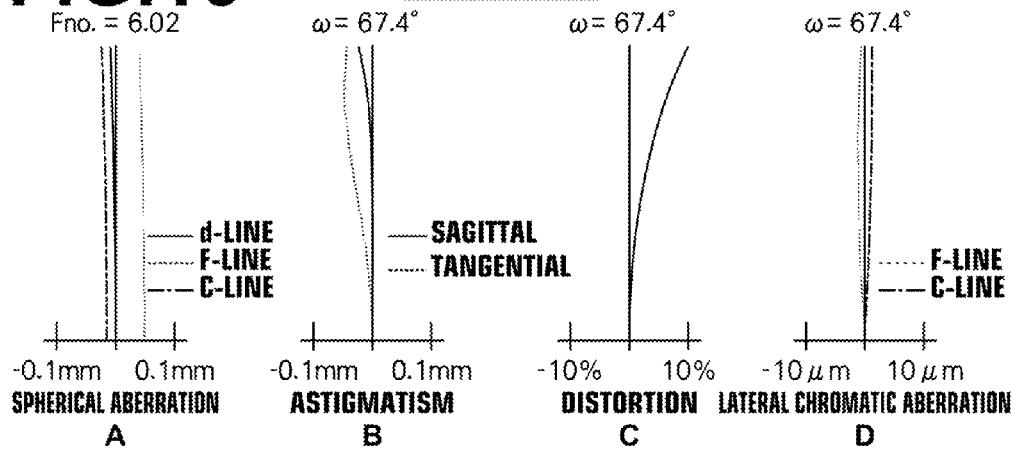

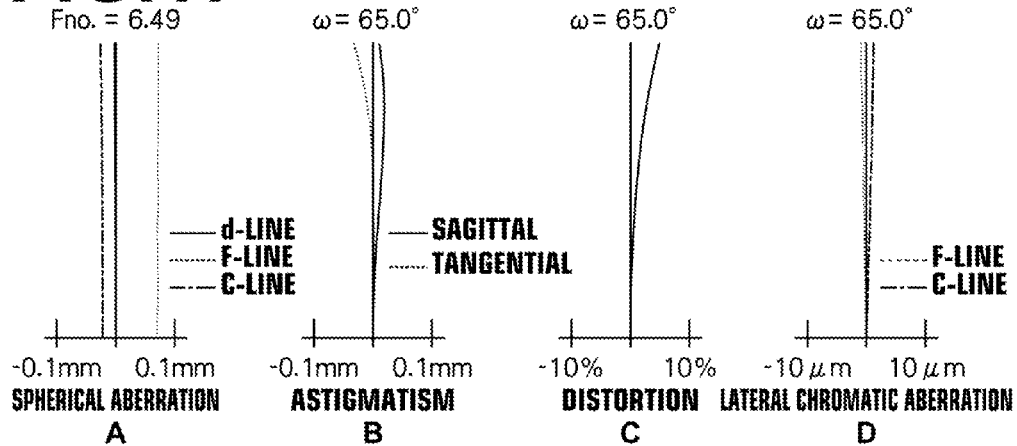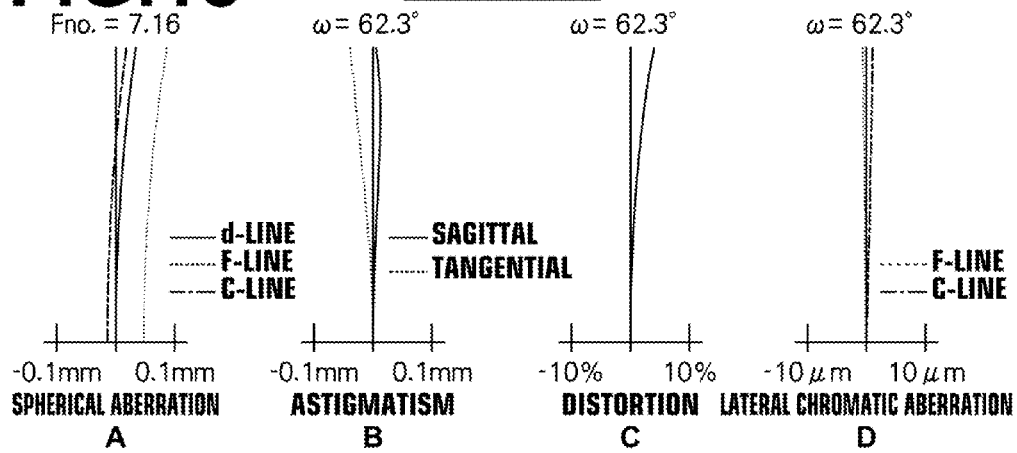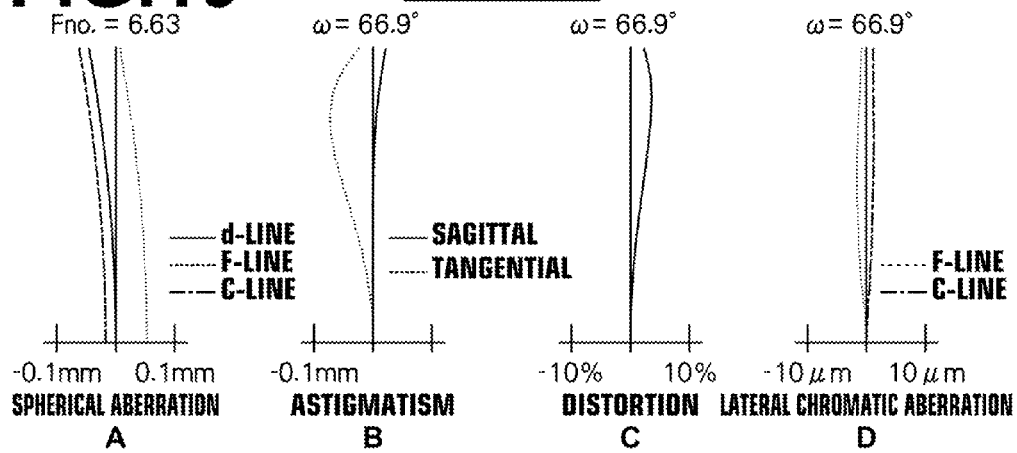

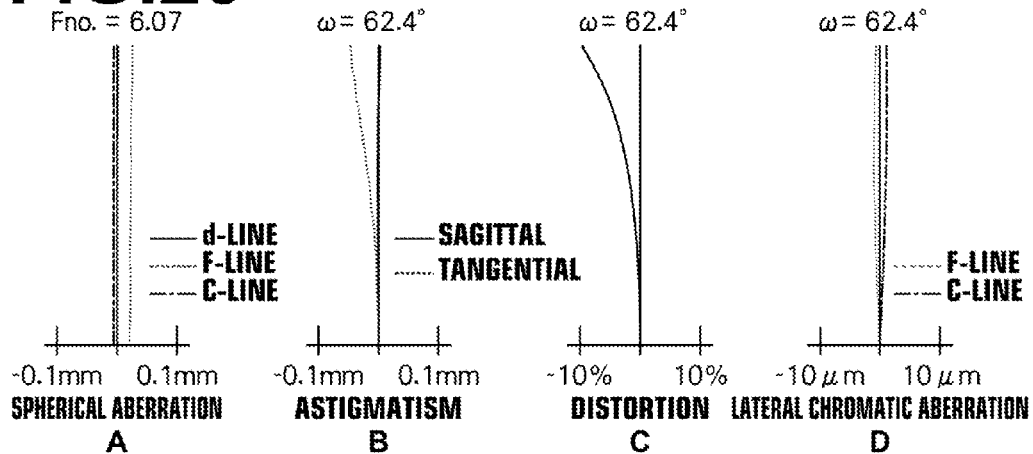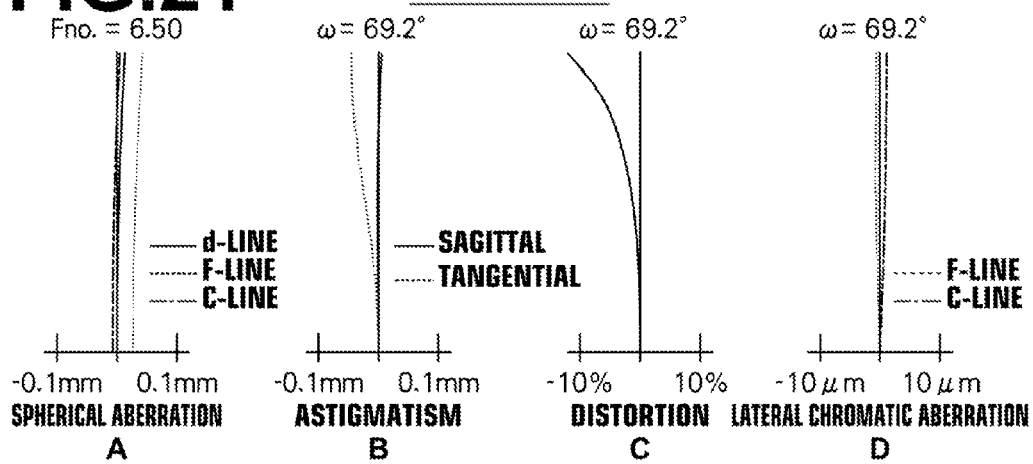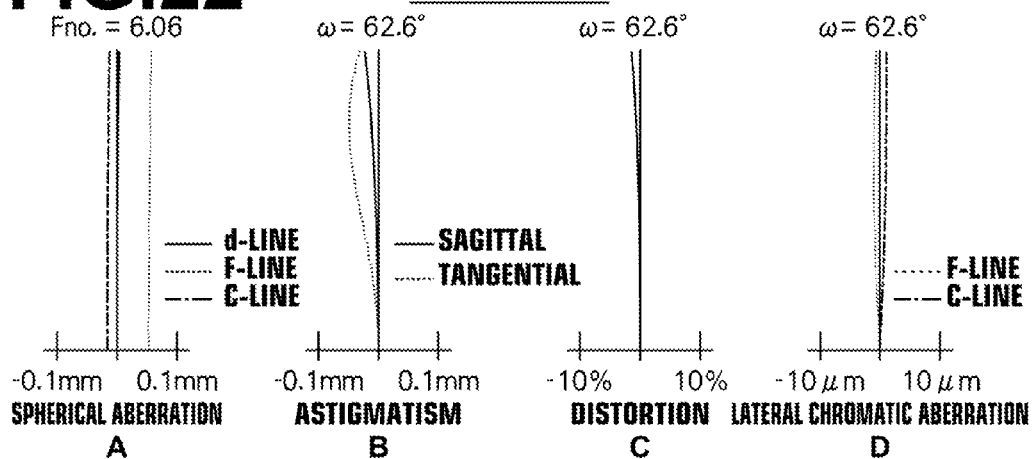

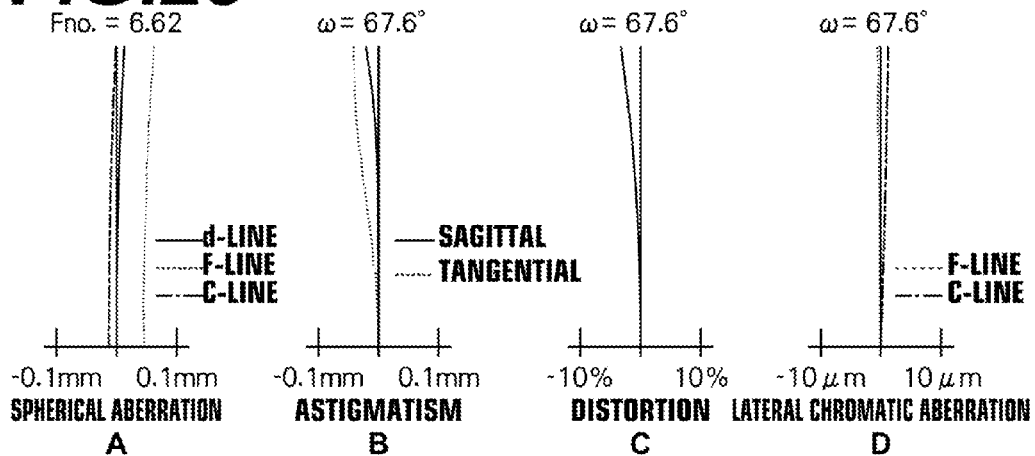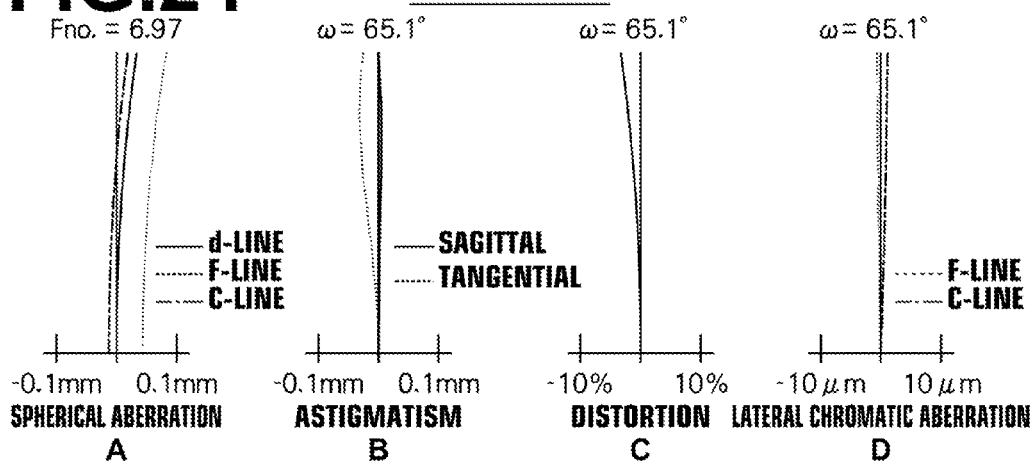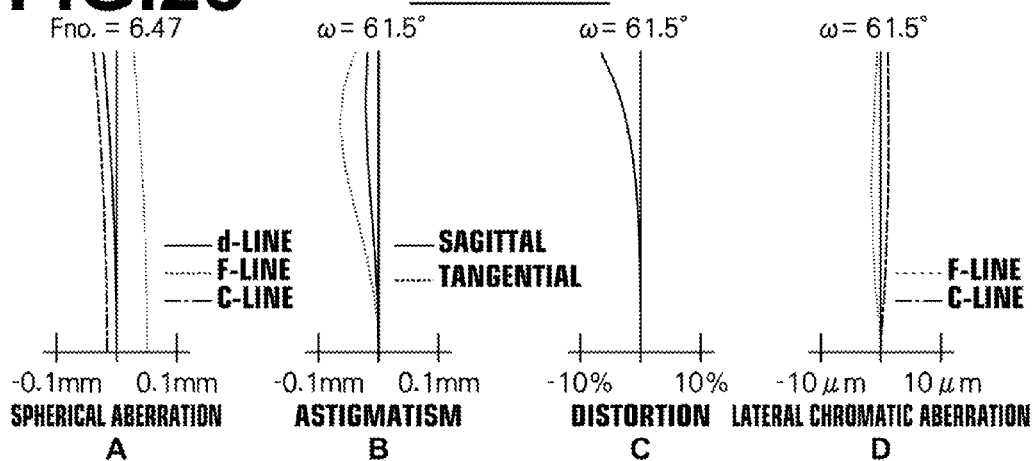

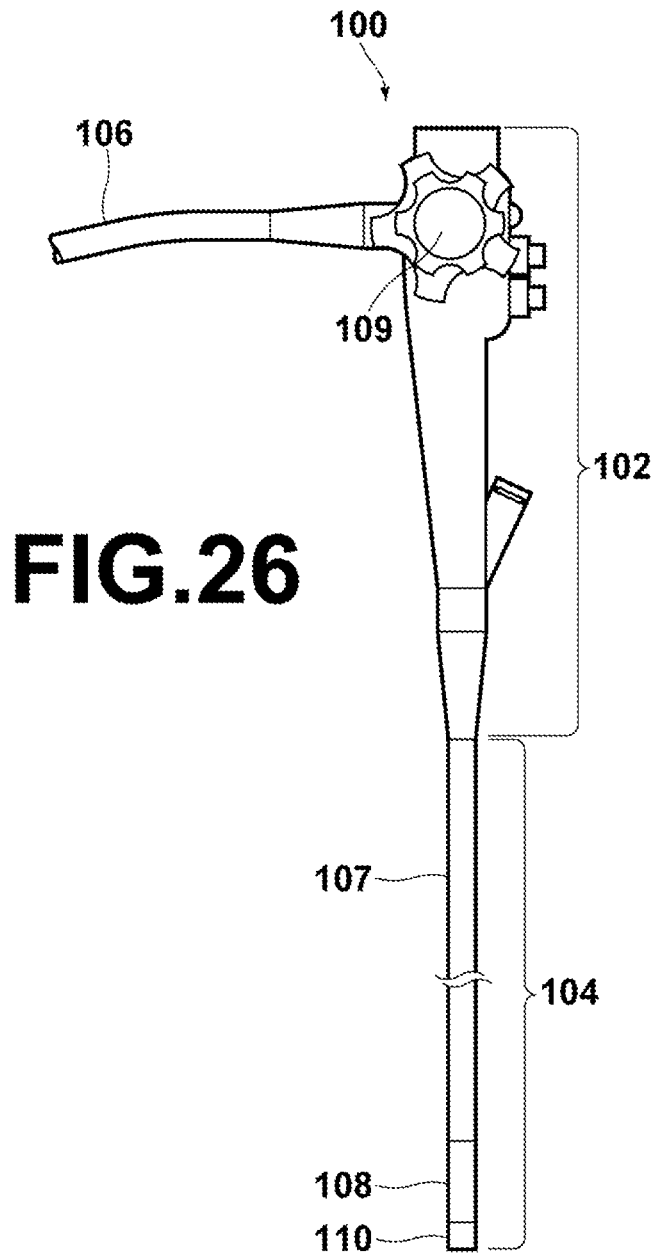

IMAGING LENS AND IMAGING APPARATUS

CROSS REFERENCE TO RELATED APPLICATIONS

This application is a continuation of PCT/JP2012/001822 filed on Mar. 15, 2012, which claims foreign priority to Japanese application No. 2011-060039 filed on Mar. 18, 2011. The entire contents of each of the above applications are hereby incorporated by reference.

BACKGROUND OF THE INVENTION

1. Field of the Invention

The present invention relates to an imaging lens and an imaging apparatus. In particular, the present invention relates to an imaging lens having a wide angle of view and a long back focus, and an imaging apparatus including the imaging lens.

2. Description of the Related Art

Conventionally, small wide-angle imaging lenses were used in the fields of in-vehicle cameras, surveillance cameras, endoscopes and the like. In recent years, an imaging lens is generally used in combination with an imaging device that images an image formed by the imaging lens. In such a case, an optical low-pass filter, an infrared ray cut filter and the like are often placed between the lens system and the imaging device. Therefore, a sufficient back focus is needed. Further, in some type of endoscope, an imaging plane of an imaging device is arranged parallel to the long axial direction of an insertion unit of the endoscope. In such a type of endoscope, an optical path conversion member, such as an optical path conversion prism, is generally inserted between the imaging lens and the imaging device to change the direction of the optical path. Therefore, a sufficiently long back focus is needed. Meanwhile, it is necessary to make a focal length short to obtain a wide angle of view, and it is difficult to obtain a long back focus and a wide angle of view at the same time. U.S. Patent Application Publication No. 20040125469 (Patent Document 1), Japanese Unexamined Patent Publication No. 63(1988)-261213 (Patent Document 2), Japanese Unexamined Patent Publication No. 2008-257108 (Patent Document 3), Japanese Unexamined Patent Publication No. 2008-257109 (Patent Document 4), and U.S. Patent Application Publication No. 20100305405 (Patent Document 5) disclose imaging lenses for endoscopes invented by the inventor of the present invention, and in which both a long back focus and a wide angle of view are realized.

SUMMARY OF THE INVENTION

Meanwhile, the development of imaging devices progressed, and a demand for higher resolution imaging devices and a demand for high image quality lens systems became strong. Many imaging lenses for endoscopes have large F-numbers to obtain deep depths of field. Therefore, a spherical aberration and a coma aberration seldom act as important factors for determining image qualities, and excellent correction of a lateral chromatic aberration is effective to improve the image qualities. The lateral chromatic aberration tends to be a problem in widening an angle of view and in using a lens system in combination with an imaging device. Therefore, correction of a lateral chromatic aberration is important in the lens systems of the aforementioned fields. Further, correction of a longitudinal chromatic aberration is also important in endoscopes, in which a lesion in a tissue of a living body is observed or treated.

In view of the foregoing circumstances, it is an object of the present invention to provide an imaging lens having both a long back focus and a wide angle of view, and in which chromatic aberrations are excellently corrected, and an imaging apparatus including the imaging lens.

An imaging lens of the present invention is an imaging lens consisting of six lenses in four groups, wherein a first lens, a first cemented lens composed of a second lens and a third lens cemented together, a fourth lens, and a second cemented lens composed of a fifth lens and a sixth lens cemented together are arranged in this order from an object side, and wherein the first lens has a plano-concave shape or a meniscus shape with a concave image-side surface, and negative refractive power, and wherein one of the second lens and the third lens in the first cemented lens has positive refractive power and the other one of the second lens and the third lens has negative refractive power, and wherein the fourth lens has positive refractive power and an object-side surface of the fourth lens is a flat surface or a surface with a curvature radius the absolute value of which is greater than the absolute value of a curvature radius of an image-side surface of the fourth lens, and wherein one of the fifth lens and the sixth lens in the second cemented lens has positive refractive power and the other one of the fifth lens and the sixth lens has negative refractive power, and wherein a stop is arranged between the first cemented lens and the fourth lens, and wherein the following formulas (1) through (3) are satisfied:

$$1.80 < Bf/f \qquad (1);$$

$$0.15 < N1n - N1p \qquad (2); \text{ and}$$

$$0.0 < v1n - v1p < 10.0 \qquad (3), \text{ where}$$

Bf: a back focus of the entire system (a length in air),
f: a focal length of the entire system,
N1n: a refractive index of the negative lens in the first cemented lens for d-line,
N1p: a refractive index of the positive lens in the first cemented lens for d-line,
v1n: an Abbe number of the negative lens in the first cemented lens for d-line, and
v1p: an Abbe number of the positive lens in the first cemented lens for d-line.

In the imaging lens of the present invention, it is desirable that the following formulas (4) and (5) are satisfied:

$$25.0 < v2n - v2p \qquad (4); \text{ and}$$

$$0.08 < N2n - N2p < 0.32 \qquad (5), \text{ where}$$

v2n: an Abbe number of the negative lens in the second cemented lens for d-line,
v2p: an Abbe number of the positive lens in the second cemented lens for d-line,
N2n: a refractive index of the negative lens in the second cemented lens for d-line, and
N2p: a refractive index of the positive lens in the second cemented lens for d-line. Preferred ranges include $1.80 < Bf/f < 2.533$, $0.15 < N1n - N1p < 0.239$, $25.0 < v2n - v2p < 41.4$, $0.08 < N2n - N2p < 0.32$ and $30.0 < v2n - v2p < 41.4$.

An imaging apparatus of the present invention includes the imaging lens of the present invention, and an imaging device that images an optical image formed by the imaging lens and outputs electrical signals.

The expression "one of the second lens and the third lens in the first cemented lens has positive refractive power and the other one of the second lens and the third lens has negative refractive power" represents both of a case in which the second lens is a positive lens and the third lens is a negative lens, and a case in which the second lens is a negative lens and the third lens is a positive lens, and means that the second lens is arranged on the object side of the third lens. Further, what is represented and meant by the expression "one of the fifth lens and the sixth lens in the second cemented lens has positive refractive power and the other one of the fifth lens and the sixth lens has negative refractive power" is similar.

Further, the expression "the fourth lens has positive refractive power and an object-side surface of the fourth lens is a flat surface or a surface with a curvature radius the absolute value of which is greater than the absolute value of a curvature radius of an image-side surface of the fourth lens" means that the fourth lens having positive refractive power has a shape having an object-side flat surface or a shape in which the absolute value of a curvature radius of the object side surface is greater than the absolute value of a curvature radius of the image side surface.

In the aforementioned imaging lens of the present invention, the sign of the refractive power of each lens and the shape of a surface will be considered in a paraxial region when an aspherical surface is included.

According to the present invention, the refractive power, the shape and the like of each lens are appropriately set, and the system is structured in such a manner to include a cemented lens on either side of a stop. Further, predetermined formulas about the material of lenses constituting the cemented lens or lenses are satisfied. Therefore, it is possible to provide an imaging lens having both a long back focus and a wide angle of view, and in which chromatic aberrations are corrected in an excellent manner, and an imaging apparatus including the imaging lens.

BRIEF DESCRIPTION OF THE DRAWINGS

FIG. 14 is aberration diagrams of the imaging lens in Example 1 of the present invention, and Section A is a diagram of a spherical aberration, Section B is a diagram of astigmatism, Section C is a diagram of distortion, and Section D is a diagram of a lateral chromatic aberration;

FIG. 15 is aberration diagrams of the imaging lens in Example 2 of the present invention, and Section A is a diagram of a spherical aberration, Section B is a diagram of astigmatism, Section C is a diagram of distortion, and Section D is a diagram of a lateral chromatic aberration;

FIG. 16 is aberration diagrams of the imaging lens in Example 3 of the present invention, and Section A is a diagram of a spherical aberration, Section B is a diagram of astigmatism, Section C is a diagram of distortion, and Section D is a diagram of a lateral chromatic aberration;

FIG. 17 is aberration diagrams of the imaging lens in Example 4 of the present invention, and Section A is a diagram of a spherical aberration, Section B is a diagram of astigmatism, Section C is a diagram of distortion, and Section D is a diagram of a lateral chromatic aberration;

FIG. 18 is aberration diagrams of the imaging lens in Example 5 of the present invention, and Section A is a diagram of a spherical aberration, Section B is a diagram of astigmatism, Section C is a diagram of distortion, and Section D is a diagram of a lateral chromatic aberration;

FIG. 19 is aberration diagrams of the imaging lens in Example 6 of the present invention, and Section A is a diagram of a spherical aberration, Section B is a diagram of astigmatism, Section C is a diagram of distortion, and Section D is a diagram of a lateral chromatic aberration;

FIG. 20 is aberration diagrams of the imaging lens in Example 7 of the present invention, and Section A is a diagram of a spherical aberration, Section B is a diagram of astigmatism, Section C is a diagram of distortion, and Section D is a diagram of a lateral chromatic aberration;

FIG. 21 is aberration diagrams of the imaging lens in Example 8 of the present invention, and Section A is a diagram of a spherical aberration, Section B is a diagram of astigmatism, Section C is a diagram of distortion, and Section D is a diagram of a lateral chromatic aberration;

FIG. 22 is aberration diagrams of the imaging lens in Example 9 of the present invention, and Section A is a diagram of a spherical aberration, Section B is a diagram of astigmatism, Section C is a diagram of distortion, and Section D is a diagram of a lateral chromatic aberration;

FIG. 23 is aberration diagrams of the imaging lens in Example 10 of the present invention, and Section A is a diagram of a spherical aberration, Section B is a diagram of astigmatism, Section C is a diagram of distortion, and Section D is a diagram of a lateral chromatic aberration;

FIG. 24 is aberration diagrams of the imaging lens in Example 11 of the present invention, and Section A is a diagram of a spherical aberration, Section B is a diagram of astigmatism, Section C is a diagram of distortion, and Section D is a diagram of a lateral chromatic aberration;

FIG. 25 is aberration diagrams of the imaging lens in Example 12 of the present invention, and Section A is a diagram of a spherical aberration, Section B is a diagram of astigmatism, Section C is a diagram of distortion, and Section D is a diagram of a lateral chromatic aberration;

FIG. 26 is a schematic diagram illustrating the structure of an endoscope according to an embodiment of the present invention;

DESCRIPTION OF THE PREFERRED EMBODIMENTS

Figure 1:
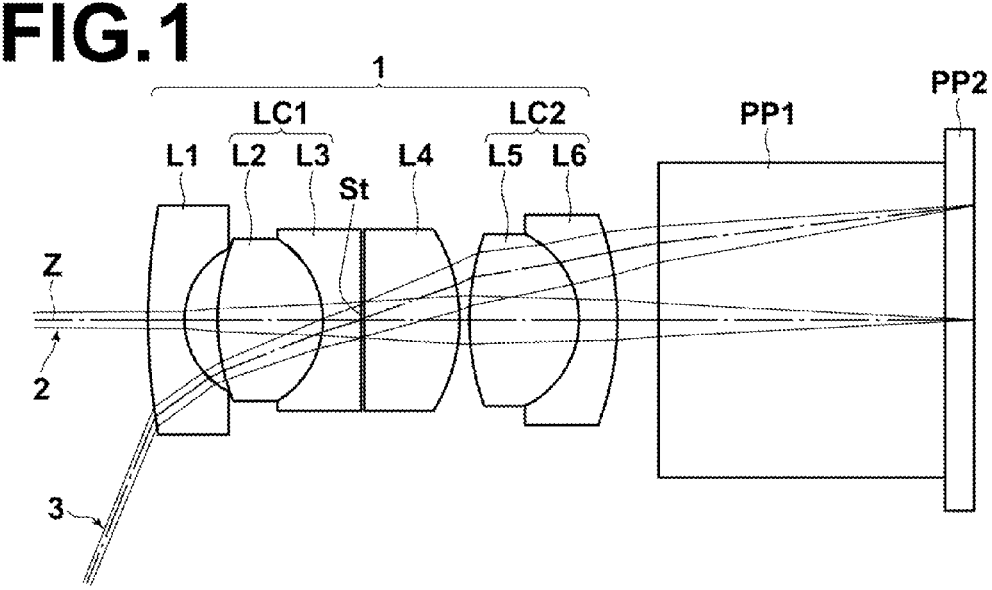
FIG. 1 is a cross section illustrating the structure of an imaging lens according to an embodiment of the present invention.
Figure 2:
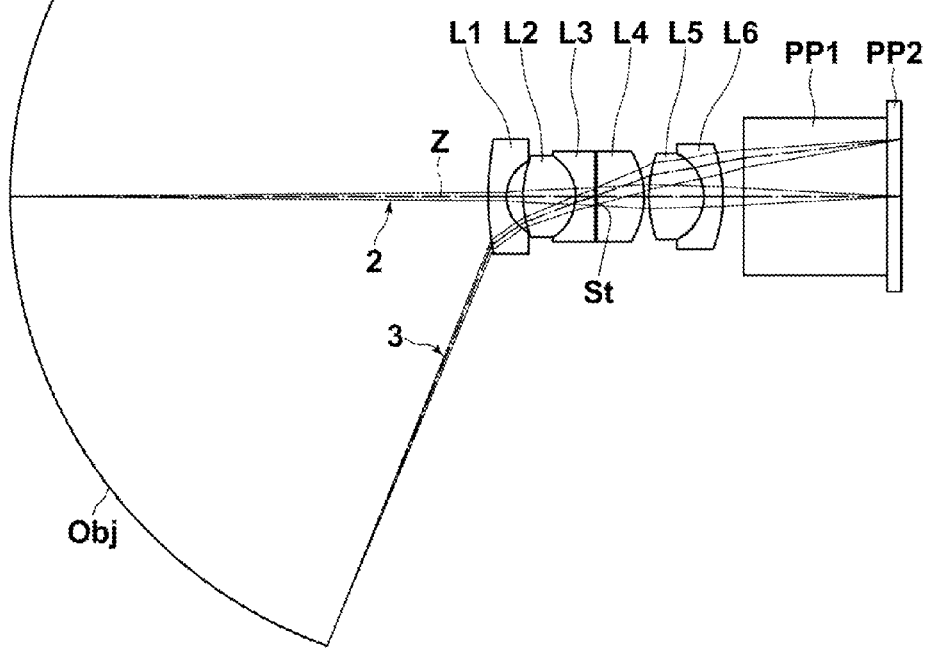
FIG. 2 is a cross section illustrating the structure of an imaging lens in Example 1 of the present invention and optical paths.
Figure 3:
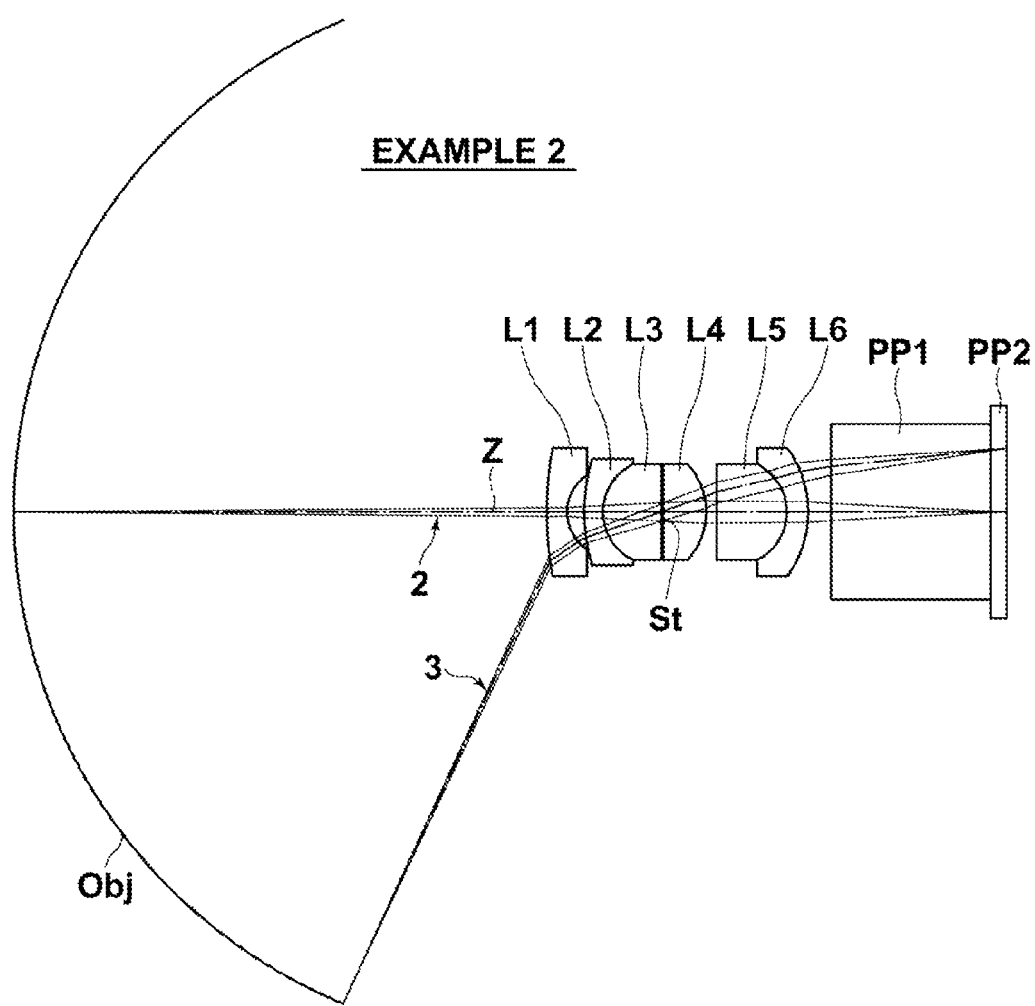
FIG. 3 is a cross section illustrating the structure of an imaging lens in Example 2 of the present invention and optical paths.
Figure 4:
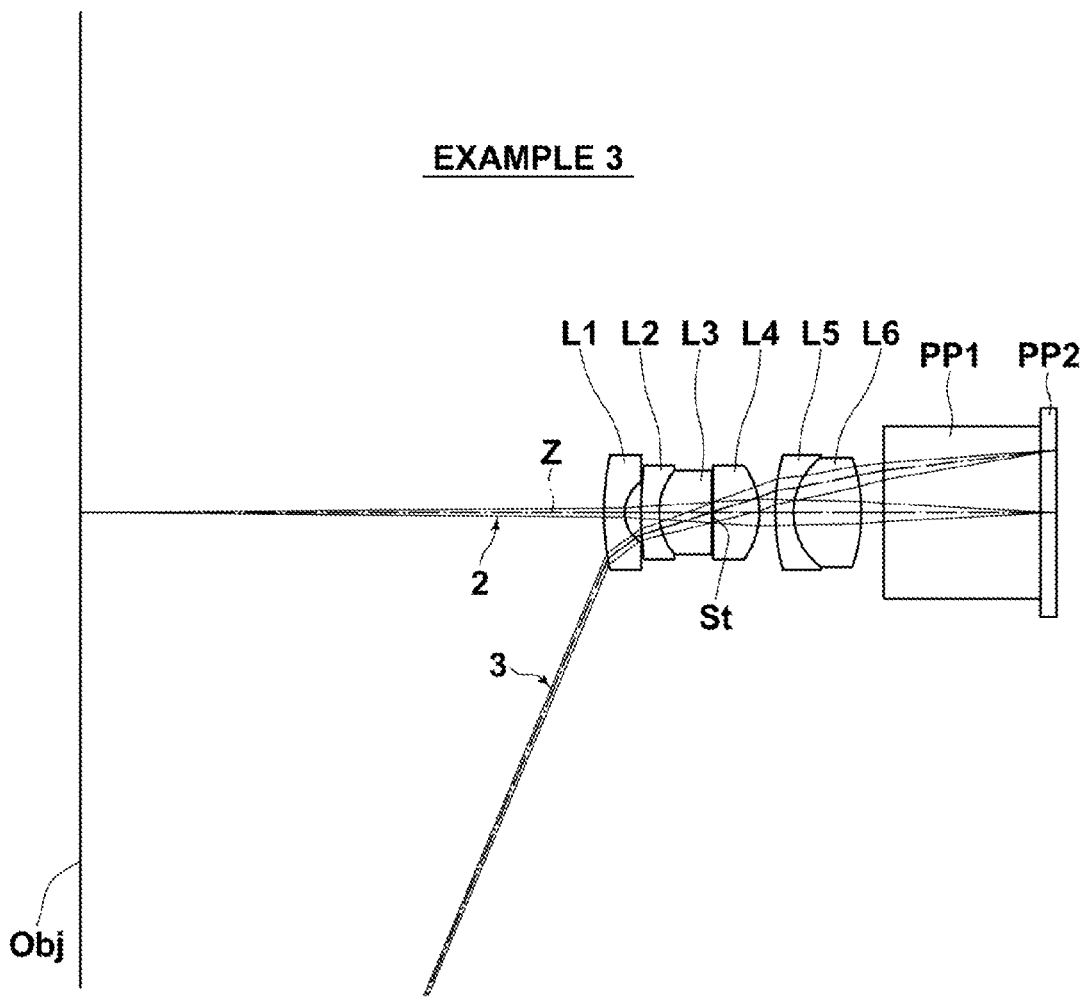
FIG. 4 is a cross section illustrating the structure of an imaging lens in Example 3 of the present invention and optical paths.
Figure 5:
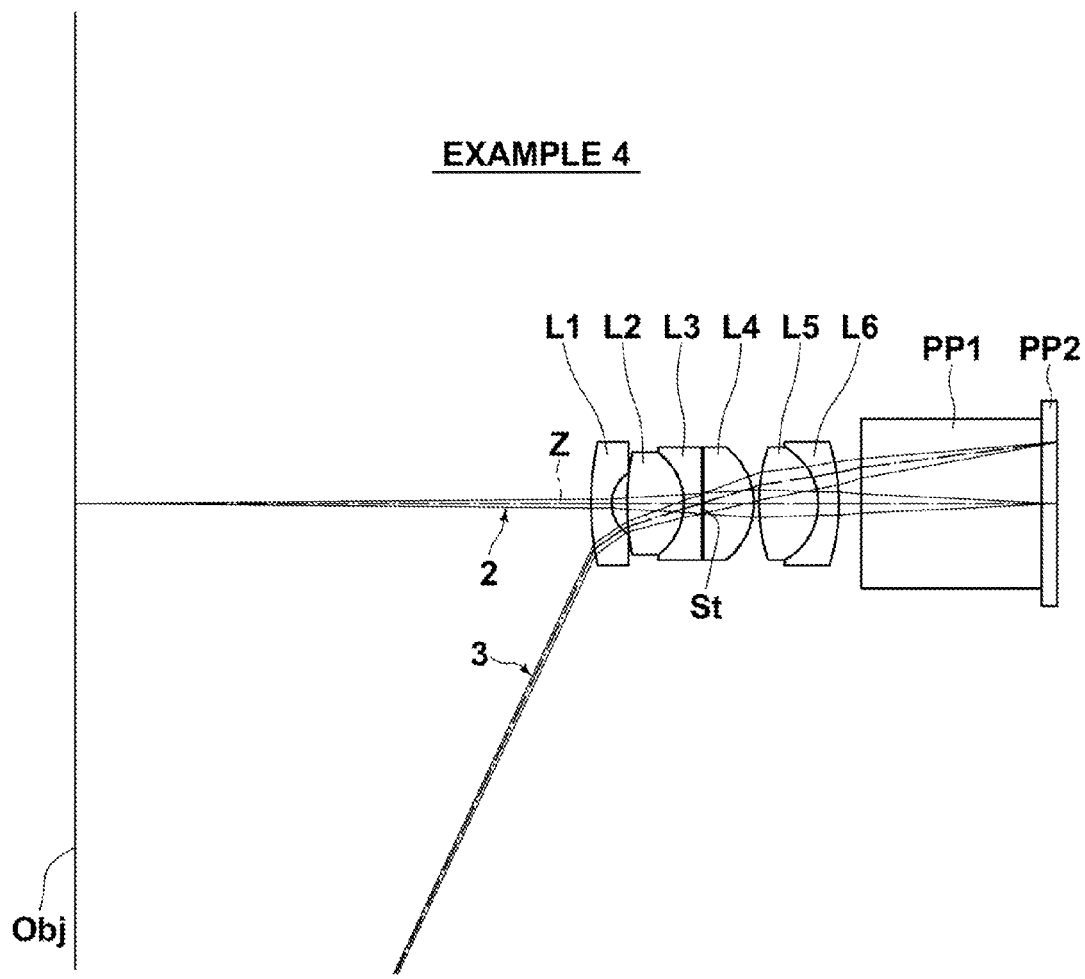
FIG. 5 is a cross section illustrating the structure of an imaging lens in Example 4 of the present invention and optical paths.
Figure 6:
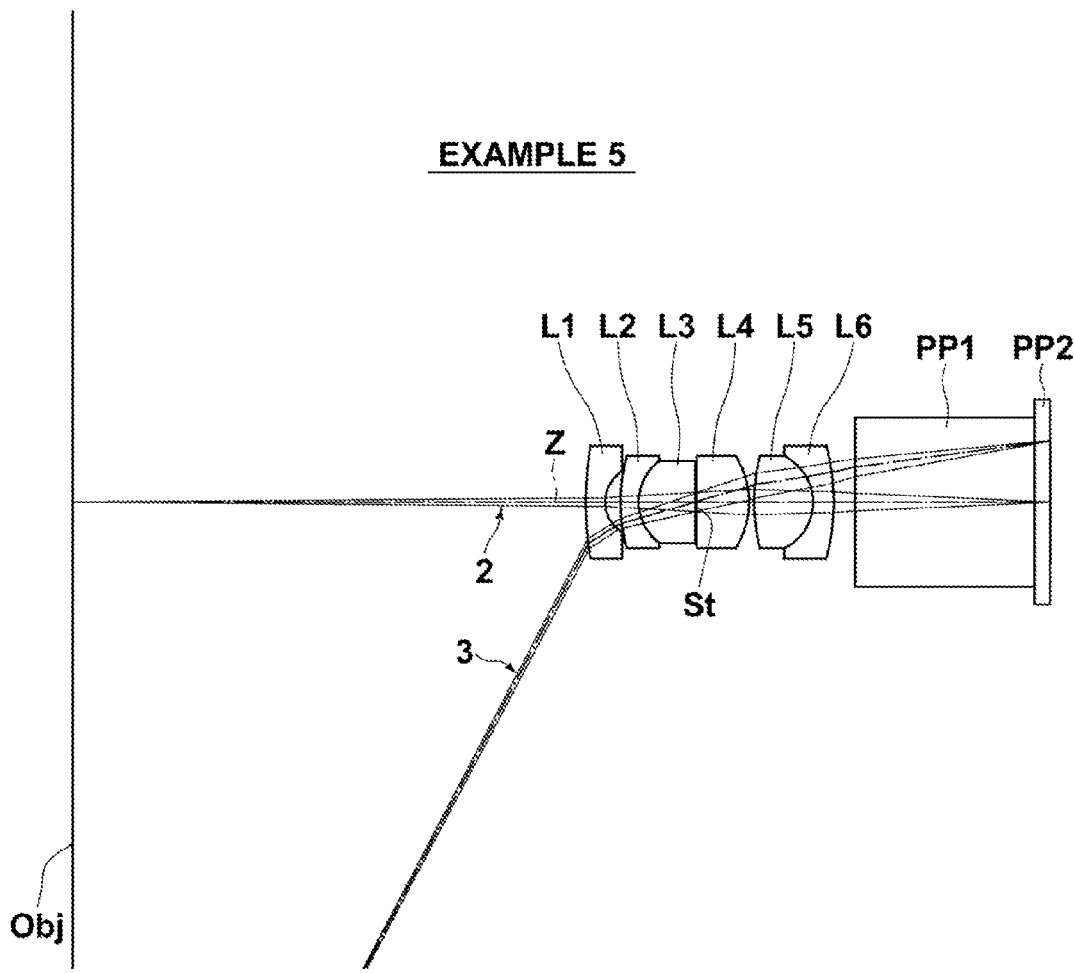
FIG. 6 is a cross section illustrating the structure of an imaging lens in Example 5 of the present invention and optical paths.
Figure 7:
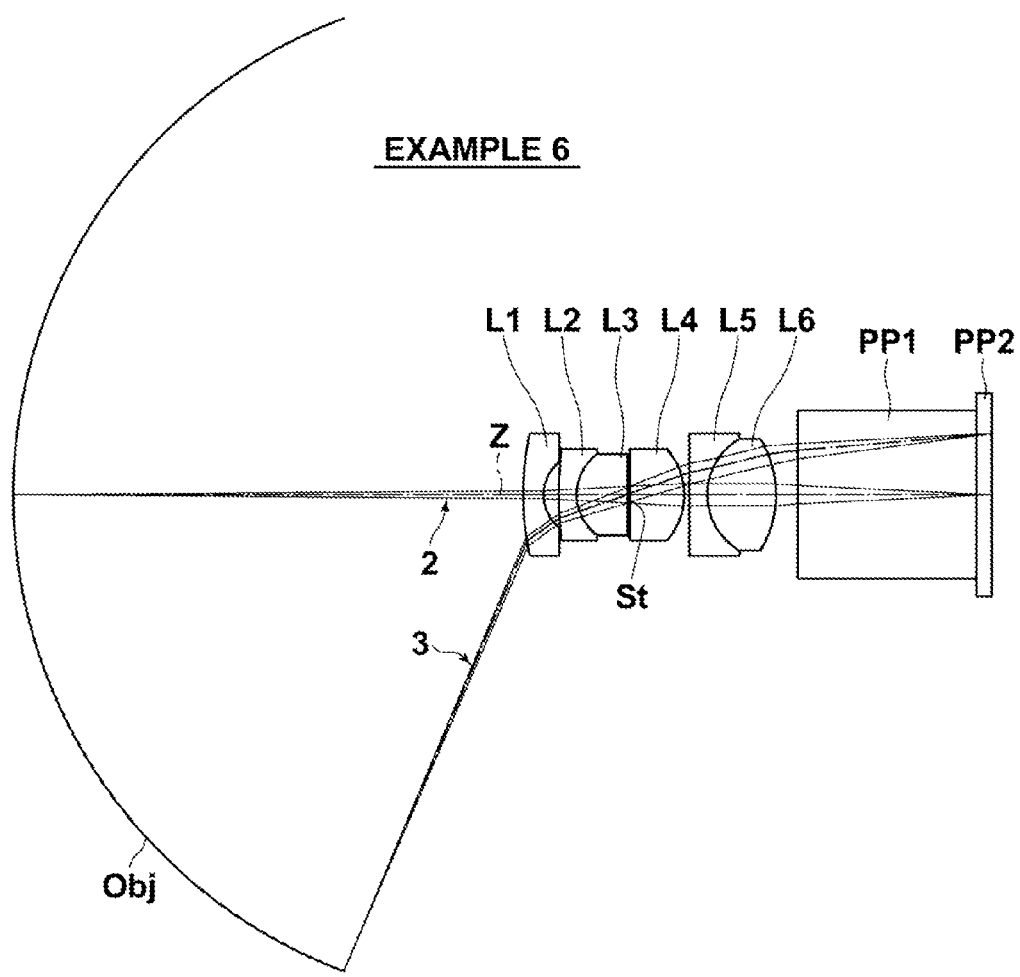
FIG. 7 is a cross section illustrating the structure of an imaging lens in Example 6 of the present invention and optical paths.
Figure 8:
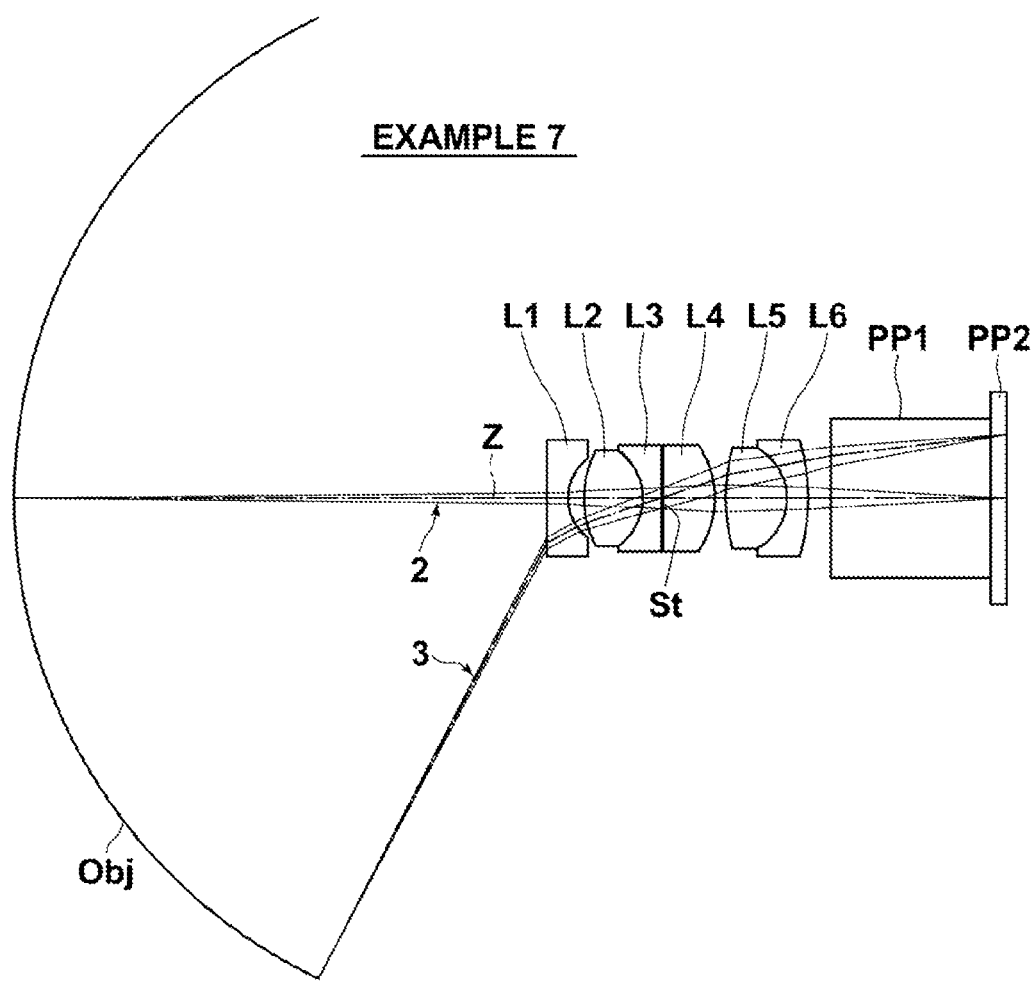
FIG. 8 is a cross section illustrating the structure of an imaging lens in Example 7 of the present invention and optical paths.
Figure 9:
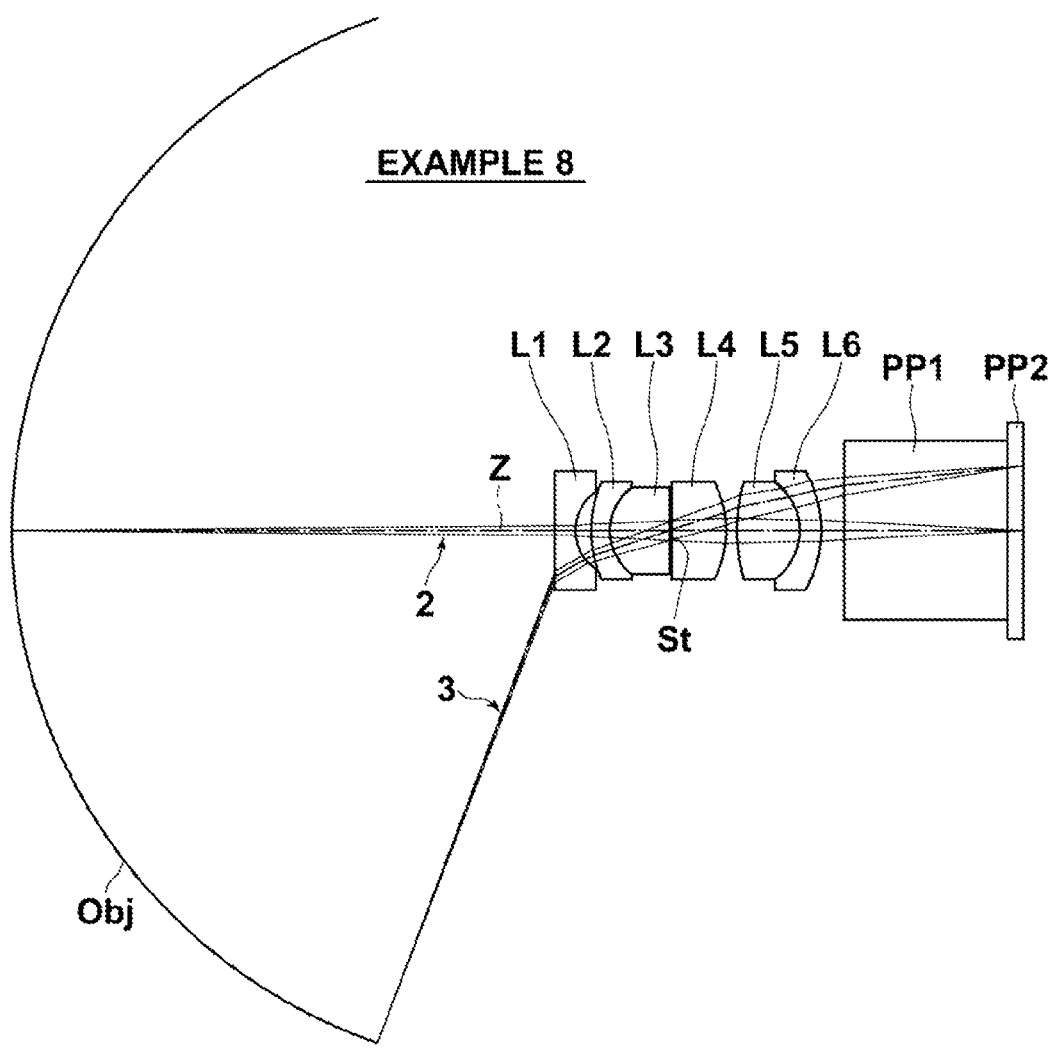
FIG. 9 is a cross section illustrating the structure of an imaging lens in Example 8 of the present invention and optical paths.
Figure 10:
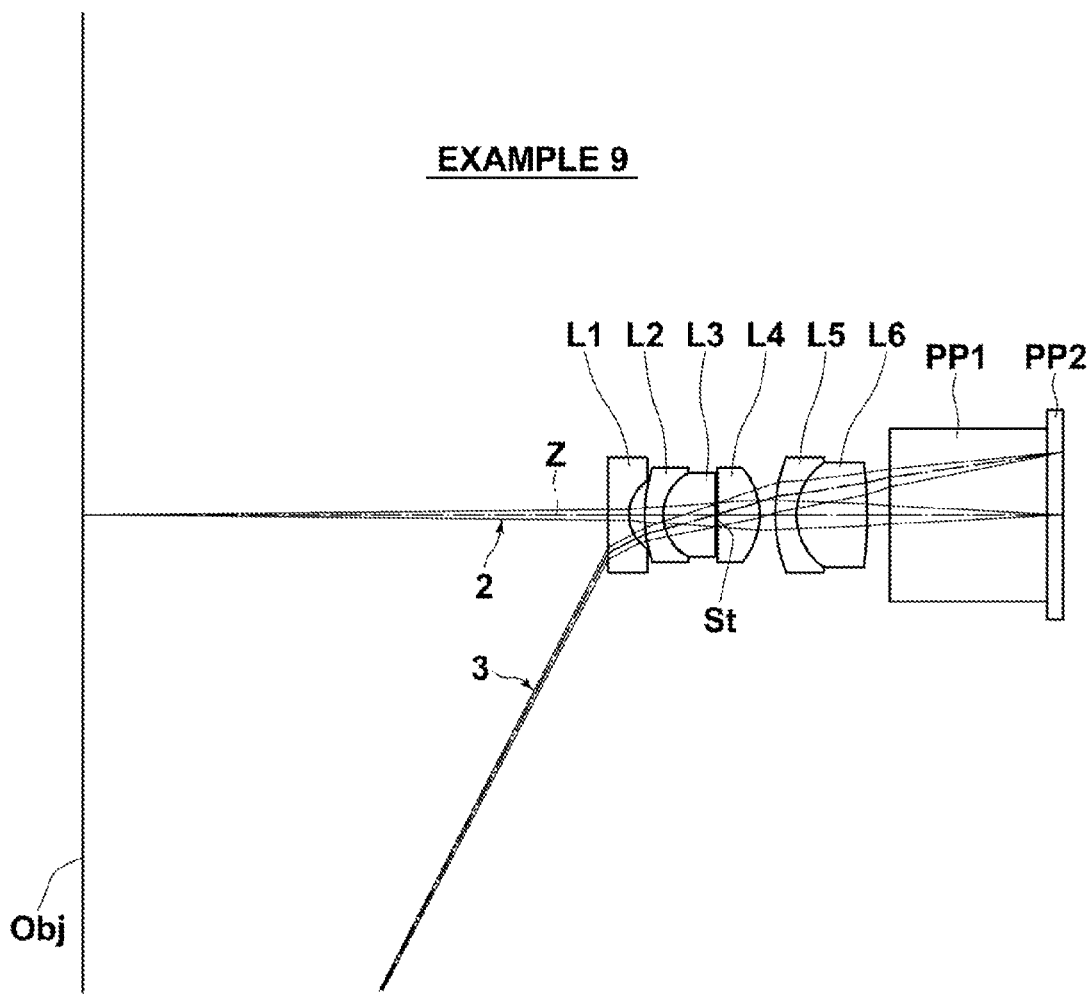
FIG. 10 is a cross section illustrating the structure of an imaging lens in Example 9 of the present invention and optical paths.
Figure 11:
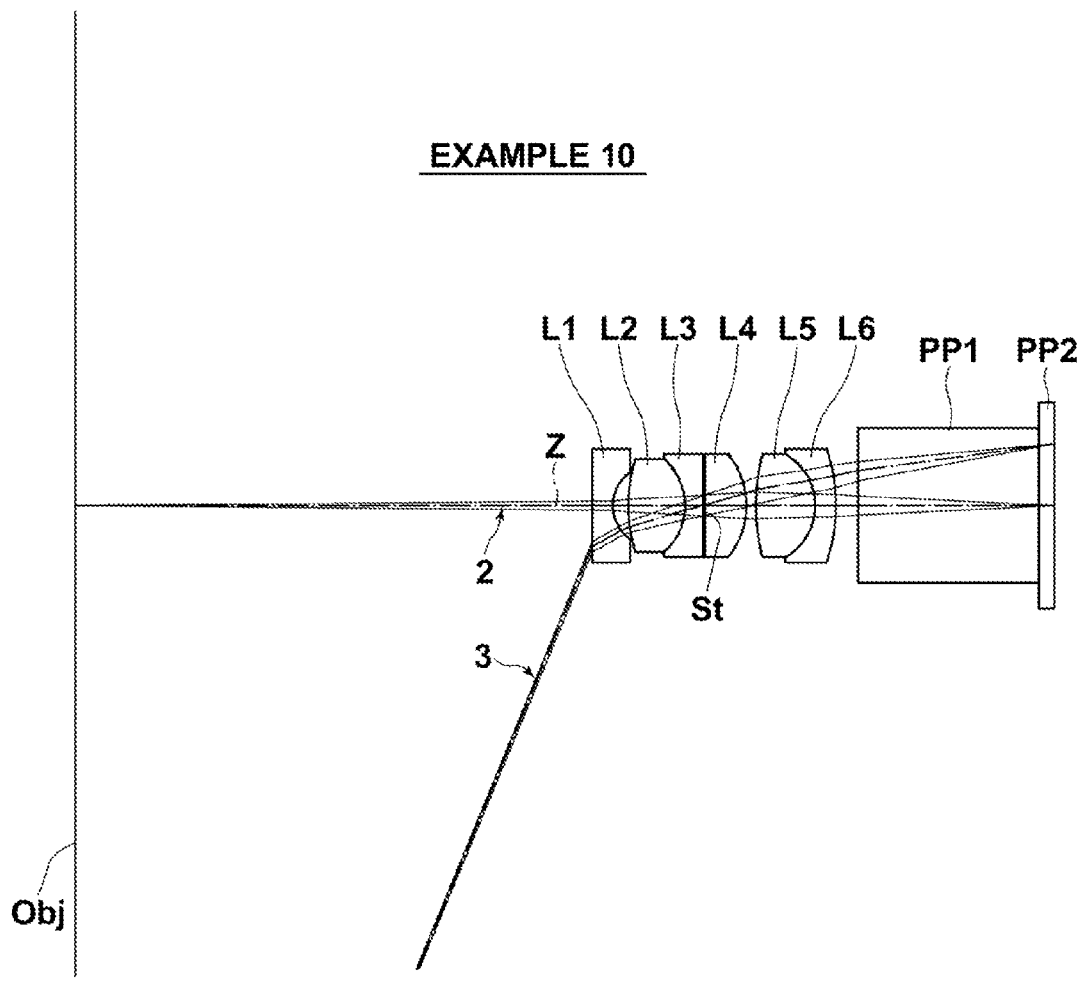
FIG. 11 is a cross section illustrating the structure of an imaging lens in Example 10 of the present invention and optical paths.
Figure 12:
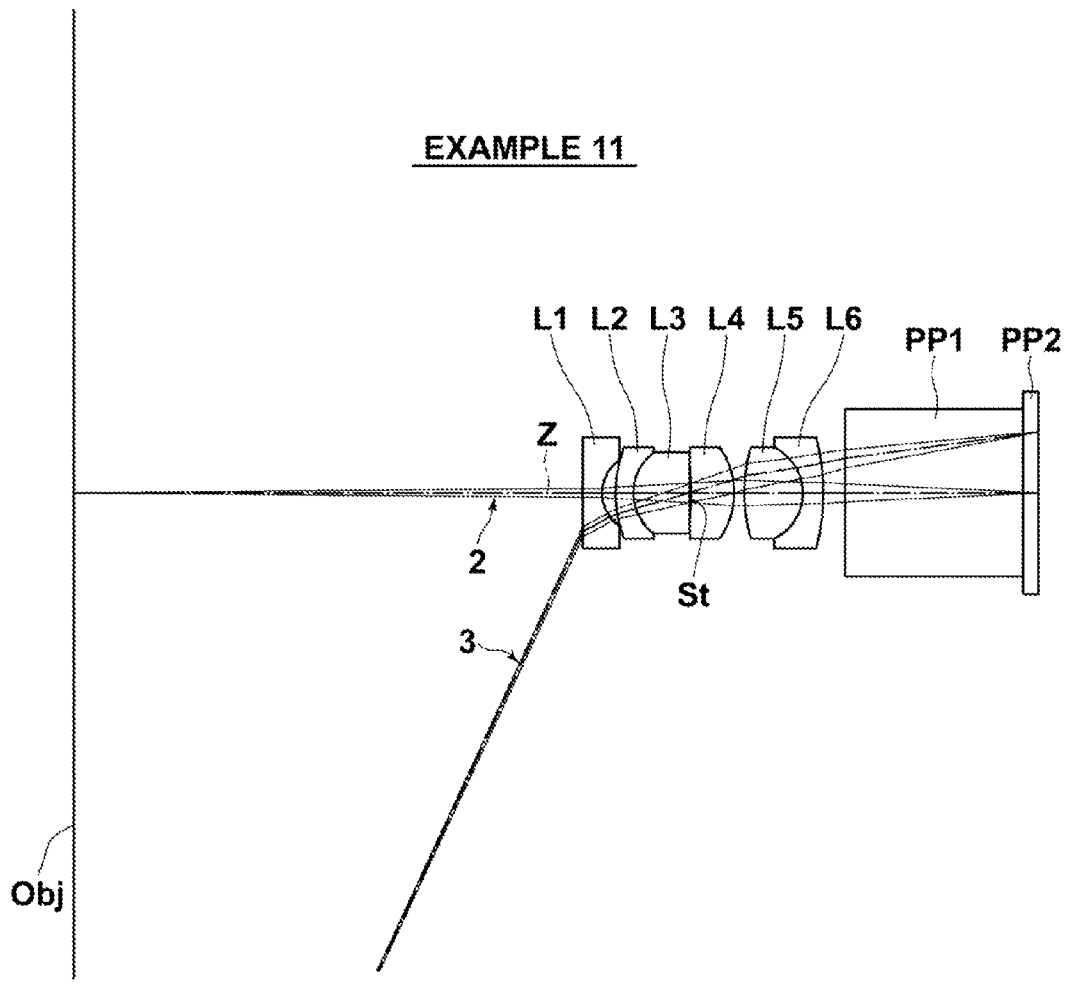
FIG. 12 is a cross section illustrating the structure of an imaging lens in Example 11 of the present invention and optical paths.
Figure 13:
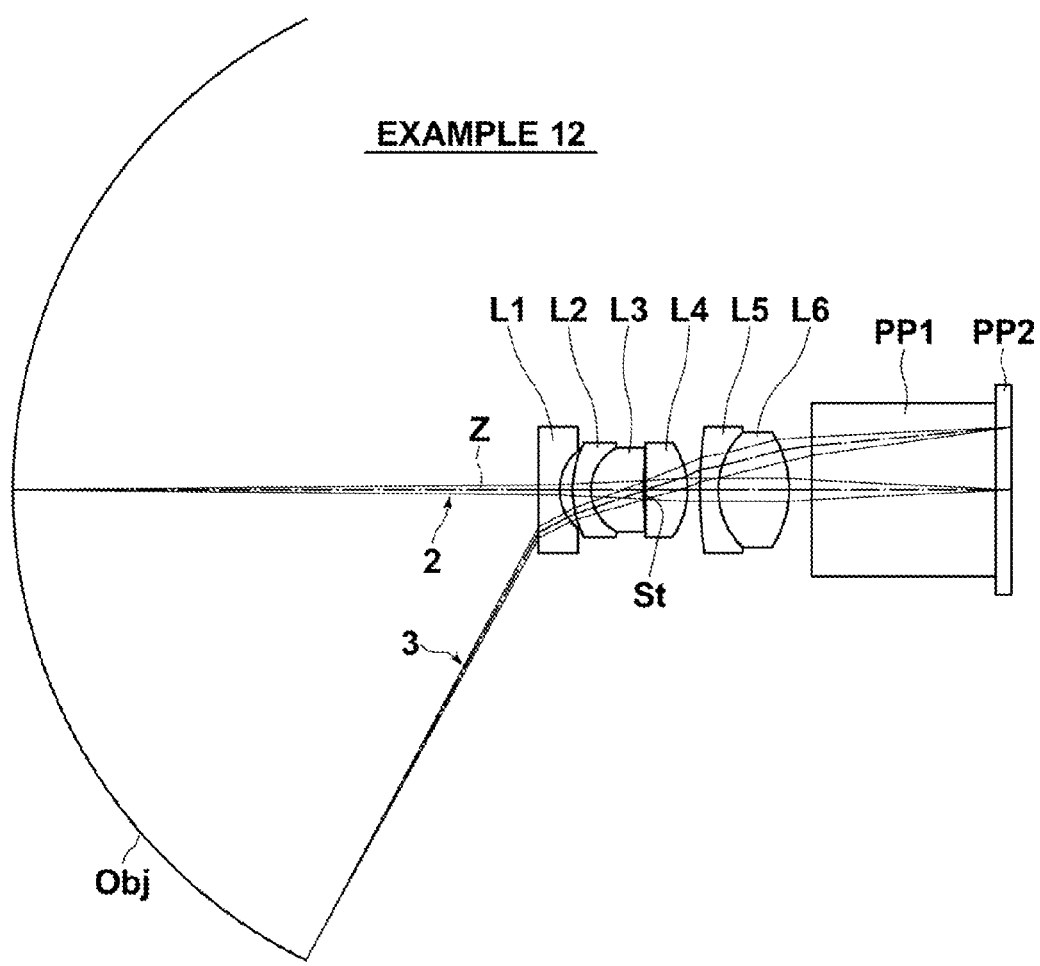
FIG. 13 is a cross section illustrating the structure of an imaging lens in Example 12 of the present invention and optical paths.

Hereinafter, with reference to drawings, an embodiment of the present invention will be described in detail. FIG. 1 illustrates the structure of an imaging lens 1 according to an embodiment of the present invention on a cross section including optical axis Z. The example of structure illustrated in FIG. 1 corresponds to a lens structure in Example 1, which will be described later. In FIG. 1, the left side is an object side, and a right side is an image side. In FIG. 1, axial rays 2 and off-axial rays 3 at a maximum angle of view are also illustrated. FIG. 1 illustrates an example in which parallel-flat-plate-shaped optical members PP1 and PP2, which are assumed to be an optical path conversion prism, a filter, a cover glass, or the like, are arranged on the image side of the imaging lens 1.

The imaging lens 1 has 4-group 6-lens structure, and consists of first lens L1, first cemented lens LC1 composed of second lens L2 and third lens L3 cemented together, fourth lens L4, and second cemented lens LC2 composed of fifth lens L5 and sixth lens L6 cemented together, which are arranged in this order from an object side. First lens L1 has a plano-concave shape or a meniscus shape with a concave image-side surface, and negative refractive power. One of second lens L2 and third lens L3 in first cemented lens LC1 has positive refractive power and the other one of second lens L2 and third lens L3 has negative refractive power. Fourth lens L4 has positive refractive power and an object-side surface of fourth lens L4 is a flat surface or a surface with a curvature radius the absolute value of which is greater than the absolute value of a curvature radius of an image-side surface of fourth lens L4. One of fifth lens L5 and sixth lens L6 in second cemented lens LC2 has positive refractive power and the other one of fifth lens L5 and sixth lens L6 has negative refractive power.

FIG. 1 illustrates, as an example, first cemented lens LC1 in which positive second lens L2 and negative third lens L3 are arranged in this order from the object side and cemented together. Alternatively, negative second lens L2 and positive third lens L3 may be arranged in this order from the object side and cemented together. Similarly, FIG. 1 illustrates, as an example, second cemented lens LC2 in which positive fifth lens L5 and negative sixth lens L6 are arranged in this order from the object side and cemented together. Alternatively, negative fifth lens L5 and positive sixth lens L6 may be arranged in this order from the object side and cemented together.

Aperture stop St is arranged between first cemented lens LC1 and fourth lens L4. The aperture stop illustrated in FIG. 1 does not represent the shape nor the size of the aperture stop, but the position of the aperture stop on optical axis Z. In the imaging lens 1, a cemented lens composed of a positive lens and a negative lens cemented together is arranged on each of the object side of aperture stop St and the image side of aperture stop St. Such arrangement is advantageous to correction of a lateral chromatic aberration.

The imaging lens 1 is a retrofocus-type lens system to obtain a wide angle of view and a long back focus. A front group consisting of first lens L1 and first cemented lens LC1 on the object side of aperture stop St has negative power, as the whole group. First lens L1 has a large part of this negative power. However, a cemented surface of first cemented lens LC1 also has negative power, using a difference between the refractive index of second lens L2 and the refractive index of third lens L3, and contributes to obtainment of both a wide angle of view and a long back focus.

The imaging lens 1 is structured so as to satisfy the following formulas (1) through (3):

$$1.80 < Bf/f \quad (1);$$

$$0.15 < N1n - N1p \quad (2); \text{ and}$$

$$0.0 < v1n - v1p < 10.0 \quad (3), \text{ where}$$

Bf: a back focus of the entire system (a length in air), f: a focal length of the entire system, N1n: a refractive index of the negative lens in the first cemented lens for d-line, N1p: a refractive index of the positive lens in the first cemented lens for d-line, v1n: an Abbe number of the negative lens in the first cemented lens for d-line, and v1p: an Abbe number of the positive lens in the first cemented lens for d-line.

Formula (1) represents the length of a back focus necessary to insert an optical path conversion prism, and the like. When the system is structured so as to satisfy formula (1), it is possible to secure a long back focus relative to a focal length. Therefore, it is possible to arrange various filters, a thick optical path conversion member, and the like between the imaging lens and the imaging plane.

Formula (2) is related to the power of a cemented surface of first cemented lens LC1. Power φ of each surface of a lens is represented by a value obtained by dividing a difference (n'−n) between the refractive index of a medium on the entrance side of the surface and the refractive index of a medium on the exit side of the surface by curvature radius r when the refractive index of the medium on the entrance side of the surface is n and the refractive index of the medium on the exit side of the surface is n'. In other words, power φ of each surface is represented by (n'−n)/r. Here, the sign of curvature radius r is positive when the shape of a surface is convex toward the object side, and the sign of curvature radius r is negative when the shape of a surface is convex toward the image side.

Formula (2) defines a difference between the refractive index of a negative lens and the refractive index of a positive lens necessary to obtain sufficient negative power on the cemented surface of first cemented lens LC1. When the value is lower than the lower limit of formula (2), it becomes impossible to obtain sufficient negative power on the cemented surface of first cemented lens LC1, and it becomes difficult to achieve both a wide angle of view and a long back focus.

Formula (3) represents a difference between the Abbe number of the positive lens and the Abbe number of the negative lens that is necessary when materials are selected so as to achieve the difference between the refractive index of the positive lens and the refractive index of the negative lens defined in formula (2). First cemented lens LC1 is located on the object side of aperture stop St. Therefore, as the Abbe number of the positive lens is larger, a longitudinal chromatic aberration is over-corrected, and a lateral chromatic aberration is under-corrected. In contrast, as the Abbe number of the negative lens is larger, a longitudinal chromatic aberration is under-corrected, and a lateral chromatic aberration is over-corrected. Here, it is necessary that the difference between the Abbe number of the negative lens and the Abbe number of the positive lens is positive, in other words, it is necessary that the Abbe number of the negative lens is larger than the Abbe number of the positive lens. Further, it is necessary that the difference is not extremely large.

When the value is lower than the lower limit of formula (3), the Abbe number of the positive lens in first cemented lens LC1 is large, and a longitudinal chromatic aberration is over-corrected, and a lateral chromatic aberration is under-corrected, as described above. When the value exceeds the upper limit of formula (3), the Abbe number of the negative lens in first cemented lens LC1 becomes larger than an assumed number, and a longitudinal chromatic aberration is under-corrected, and a lateral chromatic aberration is over-corrected.

Further, it is desirable that the imaging lens 1 satisfies the following formulas (4) and (5):

$$25.0 < v2n - v2p \qquad (4); \text{ and}$$

$$0.08 < N2n - N2p < 0.32 \qquad (5), \text{ where}$$

v2n: an Abbe number of the negative lens in the second cemented lens for d-line,
v2p: an Abbe number of the positive lens in the second cemented lens for d-line,
N2n: a refractive index of the negative lens in the second cemented lens for d-line, and
N2p: a refractive index of the positive lens in the second cemented lens for d-line.

Formulas (4) and (5) define materials used in second cemented lens LC2. Second cemented lens LC2 is located on the image side of aperture stop St. Therefore, as the Abbe number of the positive lens is larger, both a longitudinal chromatic aberration and a lateral chromatic aberration are over-corrected. In contrast, as the Abbe number of the negative lens is larger, both a longitudinal chromatic aberration and a lateral chromatic aberration are under-corrected.

Formula (4) defines a difference between the Abbe number of the positive lens and the Abbe number of the negative lens that is necessary to make the cemented surface of second cemented lens LC2, which is located away from an image formation plane, effectively correct a lateral chromatic aberration in a lens system having a long back focus. When the value is lower than the lower limit of formula (4), correction of a lateral chromatic aberration is insufficient, and that causes a deterioration of a peripheral image.

Formula (5) represents a difference between the refractive index of the negative lens and the refractive index of the positive lens that is necessary to achieve formula (4). When the value is lower than the lower limit of formula (5), a material having a large Abbe number appropriate for the positive lens is not obtainable from currently present optical materials. When the value exceeds the upper limit of formula (5), a material having a small Abbe number appropriate for the negative lens is not obtainable from currently present optical materials.

Therefore, it is more desirable that the following formula (4-1) is satisfied instead of formula (4) to correct a lateral chromatic aberration more excellently:

$$30.0 < v2n - v2p \qquad (4-1).$$

Generally, a more remarkable effect of correcting a lateral chromatic aberration is achievable when an optical member in charge of correcting a lateral chromatic aberration is arranged at a more distant position from aperture stop St. Especially, the effect is more remarkable as the optical member is arranged closer to the image formation plane when the optical member is located on the image side of aperture stop St. However, in a lens system having a long back focus of the entire system, it has been impossible to arrange the optical member close to the image formation plane. Therefore, correction of a lateral chromatic aberration has not been easy. However, since the imaging lens of the present embodiment adopts the aforementioned structure, it is possible to easily achieve both a long back focus and excellent correction of a lateral chromatic aberration.

A lateral chromatic aberration appears more noticeably as a position approaches to a peripheral area in an image. Therefore, it is very effective to excellently correct a lateral chromatic aberration to improve the image quality of the peripheral area in the image. When both a lateral chromatic aberration and a longitudinal chromatic aberration are corrected excellently in a lens system, as in the imaging lens 1 of the present embodiment, it is possible to obtain an image that is excellent from the center of the image formation area through the peripheral area.

When the imaging lens 1 is mounted on an imaging apparatus, such as an endoscope and a camera for in-vehicle use, without a protective member, first lens L1 arranged on the most object side is exposed to body fluid, washing solution, direct sunlight, wind and rain, oils and fats and the like. Therefore, it is desirable that the material of first lens L1 is highly water-resistant, weather-resistant, acid-resistant, chemical-resistant, and the like. For example, it is desirable to use, as the material of first lens L1, a material of rank 1 with respect to weight loss rates of the powder water resistance and powder acid resistance standard and weather resistance by a surface method set by Japan Optical Glass Manufacturers' Association.

Here, the object side surface of first lens L1, which is located on the most object side in the imaging lens 1, is a flat surface or a convex surface. When the object side surface of first lens L1 has such a shape, it is possible to reduce adhesion of dust, liquid or the like onto the object side surface of first lens L1, compared with a case in which the object side surface of first lens L1 is concave, when the imaging lens 1 is mounted on an imaging apparatus, such as an endoscope and a camera for in-vehicle use.

Next, numerical value examples of imaging lenses of the present invention will be described. Lens cross sections of imaging lenses of Example 1 through Example 12 are illustrated in FIG. 2 through FIG. 13, respectively. In FIG. 2 through FIG. 13, the left side of the diagram is the object side, and the right side of the diagram is the image side in a similar manner to FIG. 1. Further, axial rays 2, off-axial rays 3 at the maximum angle of view, and optical members PP1, PP2 are also illustrated. Further, in FIG. 2 through FIG. 13, spherical or flat object surface Obj is also illustrated. In the examples illustrated in FIG. 2 through FIG. 13, the position of an image formation plane is located at the position of the image-side surface of parallel flat plate PP2. However, in the imaging lens of the present invention, the position of the image formation plane is not limited to this position.

Table 1 through Table 12 show lens data about the imaging lenses of Example 1 through Example 12, respectively. In the table of lens data of each example, column Si shows the surface number of the i-th surface (i=1, 2, 3, . . . ). The most object-side surface of composition elements is the first surface, and surface numbers sequentially increase toward the image side. Column Ri shows the curvature radius of the i-th surface, and column Di shows a distance between the i-th surface and the (i+1)th surface on optical axis Z. Further, column Ndj shows the refractive index of the j-th optical member (j=1, 2, 3, . . . ) for d-line (wavelength is 587.6 nm). The most-object-side lens is the first optical member, and the number j sequentially increases toward the image side. The column vdj shows the Abbe number of the j-th optical element for d-line. Here, the lens data include aperture stop St and parallel flat plate PP. In the column Ri, the diameter of an aperture of aperture stop St in parentheses is written for the surface corresponding to aperture stop St.

Here, the sign of a curvature radius is positive when the shape of a surface is convex toward the object side, and the sign of a curvature radius is negative when the shape of a surface is convex toward the image side. As the unit for a curvature radius and a distance between surfaces in the lens data, "mm" is used, just as an example. Since a similar optical performance is achievable by proportionally enlarging or reducing the size of an optical system, other appropriate units may be used. In the following tables, values are rounded to predetermined places.

TABLE 1

EXAMPLE 1

| Si | Ri | Di | Ndj | v dj |
|---|---|---|---|---|
| 1 | 6.667 | 0.380 | 1.882998 | 40.80 |
| 2 | 0.838 | 0.350 | | |
| 3 | 2.274 | 1.100 | 1.595509 | 39.24 |
| 4 | −1.000 | 0.400 | 1.834807 | 42.71 |
| 5 | ∞ | 0.000 | | |
| 6 (APERTURE STOP) | (ø 0.38) | 0.035 | | |
| 7 | ∞ | 0.996 | 1.620408 | 60.30 |
| 8 | −1.786 | 0.100 | | |
| 9 | 2.694 | 1.150 | 1.713003 | 53.90 |
| 10 | −1.000 | 0.400 | 1.846660 | 23.78 |
| 11 | −3.125 | 0.430 | | |
| 12 | ∞ | 3.000 | 1.559196 | 53.90 |
| 13 | ∞ | 0.300 | 1.516329 | 64.10 |
| 14 (IMAGE PLANE) | ∞ | | | |

TABLE 2

EXAMPLE 2

| Si | Ri | Di | Ndj | v dj |
|---|---|---|---|---|
| 1 | 6.667 | 0.380 | 1.882998 | 40.80 |
| 2 | 0.835 | 0.326 | | |
| 3 | 3.517 | 0.350 | 1.804398 | 39.59 |
| 4 | 1.000 | 1.100 | 1.847689 | 33.79 |
| 5 | ∞ | 0.000 | | |
| 6 (APERTURE STOP) | (ø 0.35) | 0.035 | | |
| 7 | ∞ | 0.800 | 1.620408 | 60.30 |
| 8 | −1.342 | 0.200 | | |
| 9 | ∞ | 1.315 | 1.754999 | 52.32 |
| 10 | −1.008 | 0.400 | 1.922860 | 18.90 |
| 11 | −2.054 | 0.430 | | |
| 12 | ∞ | 3.000 | 1.559196 | 53.90 |
| 13 | ∞ | 0.300 | 1.516329 | 64.10 |
| 14 (IMAGE PLANE) | ∞ | | | |

TABLE 3

EXAMPLE 3

| Si | Ri | Di | Ndj | v dj |
|---|---|---|---|---|
| 1 | 5.000 | 0.400 | 1.882998 | 40.80 |
| 2 | 0.695 | 0.308 | | |
| 3 | 6.463 | 0.350 | 1.834807 | 42.71 |
| 4 | 1.250 | 1.000 | 1.647689 | 33.79 |
| 5 | ∞ | 0.000 | | |
| 6 (APERTURE STOP) | (ø 0.40) | 0.035 | | |

TABLE 3-continued

EXAMPLE 3

| Si | Ri | Di | Ndj | v dj |
|---|---|---|---|---|
| 7 | ∞ | 0.882 | 1.696803 | 55.60 |
| 8 | −1.508 | 0.300 | | |
| 9 | 4.141 | 0.350 | 1.922860 | 18.90 |
| 10 | 1.320 | 1.300 | 1.740999 | 52.64 |
| 11 | −3.267 | 0.430 | | |
| 12 | ∞ | 3.000 | 1.559196 | 53.90 |
| 13 | ∞ | 0.300 | 1.516329 | 64.10 |
| 14 (IMAGE PLANE) | ∞ | | | |

TABLE 4

EXAMPLE 4

| Si | Ri | Di | Ndj | v dj |
|---|---|---|---|---|
| 1 | 5.715 | 0.400 | 1.882998 | 40.80 |
| 2 | 0.716 | 0.300 | | |
| 3 | 5.088 | 1.100 | 1.595509 | 39.24 |
| 4 | −1.250 | 0.350 | 1.806098 | 40.92 |
| 5 | ∞ | 0.000 | | |
| 6 (APERTURE STOP) | (ø 0.40) | 0.035 | | |
| 7 | ∞ | 0.970 | 1.620408 | 60.30 |
| 8 | −1.384 | 0.100 | | |
| 9 | 3.521 | 1.150 | 1.729157 | 54.68 |
| 10 | −1.250 | 0.400 | 1.922860 | 18.90 |
| 11 | −3.953 | 0.430 | | |
| 12 | ∞ | 3.500 | 1.559196 | 53.90 |
| 13 | ∞ | 0.300 | 1.516329 | 64.10 |
| 14 (IMAGE PLANE) | ∞ | | | |

TABLE 5

EXAMPLE 5

| Si | Ri | Di | Ndj | v dj |
|---|---|---|---|---|
| 1 | 6.667 | 0.380 | 1.882998 | 40.80 |
| 2 | 0.711 | 0.300 | | |
| 3 | 3.511 | 0.350 | 1.834807 | 42.71 |
| 4 | 1.000 | 1.100 | 1.639799 | 34.46 |
| 5 | ∞ | 0.000 | | |
| 6 (APERTURE STOP) | (ø 0.38) | 0.035 | | |
| 7 | ∞ | 1.015 | 1.696803 | 55.60 |
| 8 | −1.685 | 0.100 | | |
| 9 | 3.745 | 1.150 | 1.729157 | 54.68 |
| 10 | −1.000 | 0.400 | 1.846660 | 23.78 |
| 11 | −4.263 | 0.430 | | |
| 12 | ∞ | 3.500 | 1.559196 | 53.90 |
| 13 | ∞ | 0.300 | 1.516329 | 64.10 |
| 14 (IMAGE PLANE) | ∞ | | | |

TABLE 6

EXAMPLE 6

| Si | Ri | Di | Ndj | v dj |
|---|---|---|---|---|
| 1 | 5.556 | 0.400 | 1.882998 | 40.80 |
| 2 | 0.830 | 0.300 | | |
| 3 | 8.000 | 0.350 | 1.806098 | 40.92 |
| 4 | 1.000 | 1.002 | 1.647689 | 33.79 |
| 5 | ∞ | 0.000 | | |
| 6 (APERTURE STOP) | (ø 0.33) | 0.035 | | |
| 7 | ∞ | 1.074 | 1.620408 | 60.30 |
| 8 | −1.351 | 0.100 | | |
| 9 | ∞ | 0.350 | 1.846660 | 23.78 |
| 10 | 1.274 | 1.350 | 1.740999 | 52.64 |
| 11 | −2.121 | 0.430 | | |

TABLE 6-continued

EXAMPLE 6

| Si | Ri | Di | Ndj | νdj |
|---|---|---|---|---|
| 12 | ∞ | 3.500 | 1.559196 | 53.90 |
| 13 | ∞ | 0.300 | 1.516329 | 64.10 |
| 14 (IMAGE PLANE) | ∞ | | | |

TABLE 7

EXAMPLE 7

| Si | Ri | Di | Ndj | νdj |
|---|---|---|---|---|
| 1 | ∞ | 0.400 | 1.882998 | 40.80 |
| 2 | 0.946 | 0.300 | | |
| 3 | 1.964 | 1.100 | 1.639799 | 34.46 |
| 4 | −1.111 | 0.350 | 1.804398 | 39.59 |
| 5 | ∞ | 0.000 | | |
| 6 (APERTURE STOP) | (ø 0.40) | 0.035 | | |
| 7 | ∞ | 0.972 | 1.620408 | 60.30 |
| 8 | −1.752 | 0.200 | | |
| 9 | 3.565 | 1.150 | 1.754999 | 52.32 |
| 10 | −1.086 | 0.400 | 1.846660 | 23.78 |
| 11 | −3.774 | 0.429 | | |
| 12 | ∞ | 3.000 | 1.559196 | 53.90 |
| 13 | ∞ | 0.300 | 1.516329 | 64.10 |
| 14 (IMAGE PLANE) | ∞ | | | |

TABLE 8

EXAMPLE 8

| Si | Ri | Di | Ndj | νdj |
|---|---|---|---|---|
| 1 | ∞ | 0.380 | 1.882998 | 40.80 |
| 2 | 0.875 | 0.288 | | |
| 3 | 2.163 | 0.350 | 1.806098 | 40.92 |
| 4 | 1.000 | 1.100 | 1.647689 | 33.79 |
| 5 | ∞ | 0.000 | | |
| 6 (APERTURE STOP) | (ø 0.37) | 0.035 | | |
| 7 | ∞ | 1.0060 | 1.696803 | 55.60 |
| 8 | −1.938 | 0.2000 | | |
| 9 | 3.484 | 1.1500 | 1.620408 | 60.30 |
| 10 | −1.120 | 0.4000 | 1.922860 | 18.90 |
| 11 | −2.184 | 0.429 | | |
| 12 | ∞ | 3.000 | 1.559196 | 53.90 |
| 13 | ∞ | 0.300 | 1.516329 | 64.10 |
| 14 (IMAGE PLANE) | ∞ | | | |

TABLE 9

EXAMPLE 9

| Si | Ri | Di | Ndj | νdj |
|---|---|---|---|---|
| 1 | ∞ | 0.400 | 1.882998 | 40.80 |
| 2 | 0.781 | 0.300 | | |
| 3 | 2.864 | 0.350 | 1.804398 | 39.59 |
| 4 | 0.909 | 1.000 | 1.647689 | 33.79 |
| 5 | ∞ | 0.000 | | |
| 6 (APERTURE STOP) | (ø 0.46) | 0.035 | | |
| 7 | ∞ | 0.800 | 1.620408 | 60.30 |
| 8 | −1.391 | 0.300 | | |
| 9 | 3.030 | 0.400 | 1.922860 | 18.90 |
| 10 | 1.212 | 1.350 | 1.754999 | 52.32 |
| 11 | −8.228 | 0.429 | | |
| 12 | ∞ | 3.000 | 1.559196 | 53.90 |
| 13 | ∞ | 0.300 | 1.516329 | 64.10 |
| 14 (IMAGE PLANE) | ∞ | | | |

TABLE 10

EXAMPLE 10

| Si | Ri | Di | Ndj | νdj |
|---|---|---|---|---|
| 1 | ∞ | 0.400 | 1.882998 | 40.80 |
| 2 | 0.797 | 0.300 | | |
| 3 | 3.067 | 1.100 | 1.647689 | 33.79 |
| 4 | −1.200 | 0.350 | 1.834807 | 42.71 |
| 5 | ∞ | 0.000 | | |
| 6 (APERTURE STOP) | (ø 0.41) | 0.035 | | |
| 7 | ∞ | 0.800 | 1.713003 | 53.90 |
| 8 | −1.591 | 0.183 | | |
| 9 | 3.945 | 1.150 | 1.743198 | 49.34 |
| 10 | −1.156 | 0.400 | 1.922860 | 18.90 |
| 11 | −3.433 | 0.428 | | |
| 12 | ∞ | 3.500 | 1.559196 | 53.90 |
| 13 | ∞ | 0.300 | 1.516329 | 64.10 |
| 14 (IMAGE PLANE) | ∞ | | | |

TABLE 11

EXAMPLE 11

| Si | Ri | Di | Ndj | νdj |
|---|---|---|---|---|
| 1 | ∞ | 0.380 | 1.882998 | 40.80 |
| 2 | 0.789 | 0.265 | | |
| 3 | 2.500 | 0.350 | 1.804398 | 39.59 |
| 4 | 1.000 | 1.100 | 1.647689 | 33.79 |
| 5 | ∞ | 0.000 | | |
| 6 (APERTURE STOP) | (ø 0.39) | 0.035 | | |
| 7 | −6.000 | 0.8470 | 1.696803 | 55.60 |
| 8 | −1.557 | 0.2000 | | |
| 9 | 3.354 | 1.1500 | 1.740999 | 52.64 |
| 10 | −1.000 | 0.4000 | 1.846660 | 23.78 |
| 11 | −4.338 | 0.429 | | |
| 12 | ∞ | 3.500 | 1.559196 | 53.90 |
| 13 | ∞ | 0.300 | 1.516329 | 64.10 |
| 14 (IMAGE PLANE) | ∞ | | | |

TABLE 12

EXAMPLE 12

| Si | Ri | Di | Ndj | νdj |
|---|---|---|---|---|
| 1 | ∞ | 0.400 | 1.882998 | 40.80 |
| 2 | 0.969 | 0.250 | | |
| 3 | 2.000 | 0.350 | 1.834807 | 42.71 |
| 4 | 0.909 | 1.000 | 1.647689 | 33.79 |
| 5 | 6.000 | 0.035 | | |
| 6 (APERTURE STOP) | (ø 0.35) | 0.000 | | |
| 7 | ∞ | 0.800 | 1.620408 | 60.30 |
| 8 | −1.573 | 0.236 | | |
| 9 | 8.377 | 0.350 | 1.922860 | 18.90 |
| 10 | 1.535 | 1.350 | 1.743198 | 49.34 |
| 11 | −1.995 | 0.430 | | |
| 12 | ∞ | 3.500 | 1.559196 | 53.90 |
| 13 | ∞ | 0.300 | 1.516329 | 64.10 |
| 14 (IMAGE PLANE) | ∞ | | | |

Table 13 shows various data of Example 1 through Example 12. Table 13 shows data for d-line, and the unit of length is mm for all lengths, and the unit of angle is degree for all angles.

|  |  | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 | EXAMPLE 11 | EXAMPLE 12 |
|---|---|---|---|---|---|---|---|---|---|---|---|---|---|
|  | OBJECT-SIDE SURFACE OF L1 | ⌒ SURFACE | ⌒ SURFACE | ⌒ SURFACE | ⌒ SURFACE | ⌒ SURFACE | ⌒ SURFACE | FLAT SURFACE | FLAT SURFACE | FLAT SURFACE | FLAT SURFACE | FLAT SURFACE | FLAT SURFACE |
|  | FRONT-GROUP CEMENTED LENS | +− | −+ | −+ | +− | −+ | −+ | +− | −+ | −+ | +− | −+ | −+ |
|  | REAR-GROUP CEMENTED LENS | +− | +− | −+ | +− | +− | −+ | +− | +− | −+ | +− | +− | −+ |
|  | DISTANCE TO OBJECT | 10 | 10 | 10 | 10 | 10 | 10 | 10 | 10 | 10 | 10 | 10 | 10 |
|  | OBJECT SURFACE | SPHERICAL SURFACE | SPHERICAL SURFACE | FLAT SURFACE | FLAT SURFACE | FLAT SURFACE | SPHERICAL SURFACE | SPHERICAL SURFACE | SPHERICAL SURFACE | FLAT SURFACE | FLAT SURFACE | FLAT SURFACE | SPHERICAL SURFACE |
|  | MAXIMUM IMAGE HEIGHT | 1.2 | 1.2 | 1.2 | 1.2 | 1.2 | 1.2 | 1.2 | 1.2 | 1.2 | 1.2 | 1.2 | 1.2 |
|  | FIELD OF VIEW (DEGREE) | 135.39 | 129.96 | 134.84 | 130.00 | 124.61 | 133.90 | 124.77 | 138.41 | 125.20 | 135.18 | 130.25 | 123.02 |
|  | APERTURE DIAMETER $\phi$ | 0.38 | 0.35 | 0.4 | 0.4 | 0.38 | 0.33 | 0.4 | 0.37 | 0.46 | 0.41 | 0.39 | 0.35 |
|  | F-NUMBER | 6.10 | 6.52 | 6.03 | 6.51 | 7.18 | 6.63 | 6.07 | 6.51 | 6.08 | 6.64 | 6.98 | 6.47 |
|  | f | 1.177 | 1.142 | 1.091 | 1.162 | 1.200 | 1.090 | 1.305 | 1.219 | 1.257 | 1.226 | 1.251 | 1.280 |
|  | Bf | 2.421 | 2.430 | 2.438 | 2.744 | 2.736 | 2.761 | 2.389 | 2.411 | 2.400 | 2.728 | 2.722 | 2.718 |
| EXPRESSION (1) | Bf/f | 2.058 | 2.129 | 2.235 | 2.361 | 2.279 | 2.533 | 1.831 | 1.978 | 1.909 | 2.225 | 2.176 | 2.123 |
| EXPRESSION (2) | N1n−N1p | 0.239 | 0.157 | 0.187 | 0.211 | 0.195 | 0.158 | 0.165 | 0.158 | 0.157 | 0.187 | 0.157 | 0.187 |
| EXPRESSION (3) | $\nu 1n-\nu 1p$ | 3.47 | 5.80 | 8.92 | 1.68 | 8.25 | 7.13 | 5.14 | 7.13 | 5.80 | 8.91 | 5.80 | 8.92 |
| EXPRESSION (4) | $\nu 2n-\nu 2p$ | 30.12 | 33.42 | 33.74 | 35.78 | 30.90 | 28.86 | 28.54 | 41.40 | 33.42 | 30.44 | 28.86 | 25.56 |
| EXPRESSION (5) | N2n−N2p | 0.134 | 0.168 | 0.182 | 0.194 | 0.118 | 0.106 | 0.092 | 0.302 | 0.168 | 0.180 | 0.106 | 0.103 |

Next, Table 13 will be described. The row of "OBJECT-SIDE SURFACE OF L1" shows the shape of the object-side surface of first lens L1. The row of "FRONT-GROUP CEMENTED LENS" shows the signs of power of two lenses constituting first cemented lens LC1, and the order of arrangement of power from the object side. The row of "REAR-GROUP CEMENTED LENS" shows the signs of power of two lenses constituting second cemented lens LC2, and the order of arrangement of power from the object side. For example, "+−" means a cemented lens composed of a positive lens and a negative lens that are arranged in this order from the object side and cemented together.

The row of "DISTANCE TO OBJECT" shows a distance, on an optical axis, from the object-side surface of first lens L1 to object surface Obj. Further, the row of "OBJECT SURFACE" shows the surface shape of object surface Obj. In Examples 1, 2, 6 through 8 and 12, object surface Obj is a spherical surface with a curvature radius of 10 mm. In the other examples, object surface Obj is a flat surface. Examples 1, 2, 6 through 8 12 are appropriate to image a concave-surface-shaped object or a cylindrical object. The other examples are appropriate to image a large surface close to a flat surface.

The row of "MAXIMUM IMAGE HEIGHT" shows the maximum image height, and the row of "FIELD OF VIEW (DEGREE)" shows the field of view at full angle of view. The row of "APERTURE DIAMETER φ" shows the diameter of an aperture of aperture stop St. The row of "F-number" shows effective F-number (effective F number). The row of f shows the focal length of the entire system, and the row of Bf shows the back focus of the entire system (length in air). Further, rows of "EXPRESSION (1)" THROUGH "EXPRESSION (5)" show values corresponding to the aforementioned formulas (1) through (5). All of Examples 1 through 12 satisfy all of the formulas (1) through (5).

FIG. 14, Section A through Section D illustrate a spherical aberration, astigmatism, a distortion aberration (distortion), and a lateral chromatic aberration (a chromatic aberration of magnification) in the imaging lens of Example 1, respectively. Each aberration diagram of a spherical aberration, astigmatism and a distortion aberration illustrates an aberration for d-line (wavelength is 587.6 nm), as reference wavelength. In the diagram of the spherical aberration, aberrations for F-line (wavelength is 486.1 nm) and C-line (wavelength is 656.3 nm) are also illustrated. The diagram of the lateral chromatic aberration illustrates aberrations for F-line and C-line. In the diagram of the spherical aberration, Fno. represents F-number, and in the other diagrams, ω represents a half angle of view. A distortion aberration represents a shift amount from an ideal image height when the value of the ideal image height is f×sin θ by using focal length f of the entire system and half angle θ of view (variable, 0≤θ≤ω).

Similarly, FIG. 15, Section A through Section D, FIG. 16, Section A through Section D, FIG. 17, Section A through Section D, FIG. 18, Section A through Section D, FIG. 19, Section A through Section D, FIG. 20, Section A through Section D, FIG. 21, Section A through Section D, FIG. 22, Section A through Section D, FIG. 23, Section A through Section D, FIG. 24, Section A through Section D, and FIG. 25, Section A through Section D illustrate aberration diagrams of a spherical aberration, astigmatism, a distortion aberration (distortion) and a lateral chromatic aberration (a chromatic aberration of magnification) of Examples 2 through 12, respectively. In each aberration diagram of Examples 1 through 12, a distance to object is 10 mm. As each of the aberration diagrams clearly shows, each aberration is excellently corrected in Example 1 through Example 12.

Next, with reference to FIG. 26 through FIG. 28, an embodiment of an imaging apparatus to which the imaging lens of the present invention is applied will be described. FIG. 26 is a schematic diagram illustrating the structure of an endoscope, as an example of an imaging apparatus. An endoscope 100 illustrated in FIG. 26 mainly includes an operation unit 102, an insertion unit 104, and a connecter unit (not illustrated) for drawing a universal cord 106. The insertion unit 104, which is inserted into the body of a patient, is connected to the leading end side of the operation unit 102. Further, the universal cord 106 to be connected to the connecter unit for connecting to a light source apparatus or the like is drawn from the base end side of the operation unit 102.

Most of the insertion unit 104 is a flexible portion 107 that curves in an arbitrary direction along an insertion path. A bending portion 108 is connected to the leading end of the flexible portion 107, and a hard leading end portion 110 is connected to the leading end of the bending portion 108 sequentially. The bending portion 108 is provided to direct the hard leading end portion 110 to a desirable direction. The bending operation is possible by turning a bending operation knob 109 provided in the operation unit 102.

Figure 27:
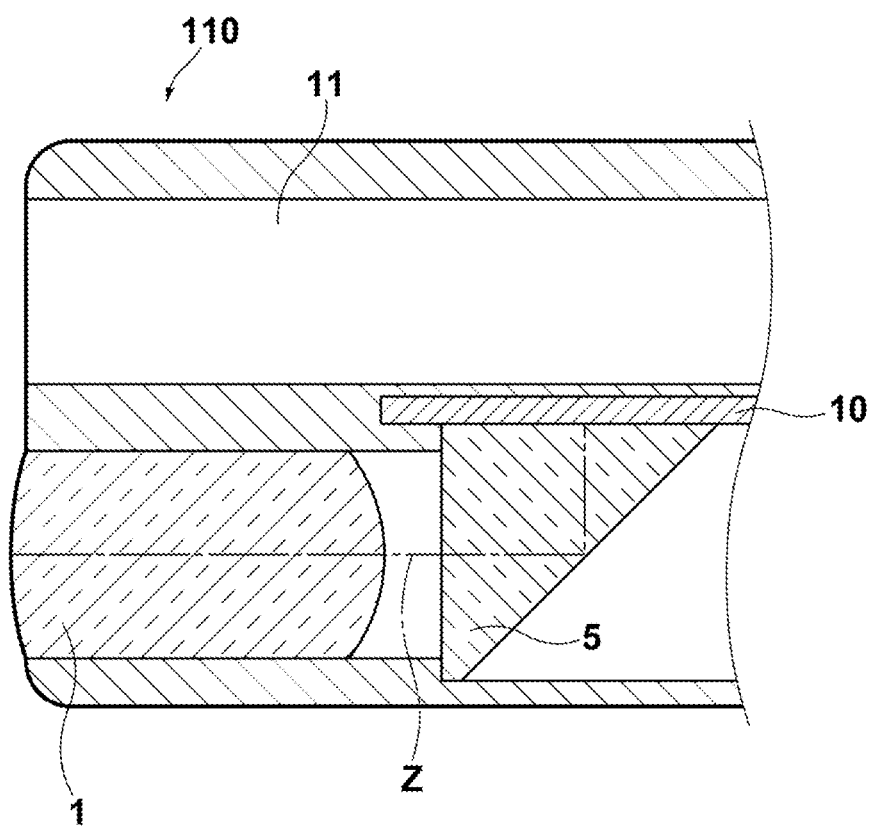
FIG. 27 is a cross section illustrating a main part in a hard leading end portion of the endoscope.

FIG. 27 illustrates a cross section of a main part of the hard leading end portion 110. As illustrated in FIG. 27, the imaging lens 1 according to an embodiment of the present invention is arranged in the hard leading end portion 110. FIG. 27 illustrates a cross section including optical axis Z of the imaging lens 1. In FIG. 27, the imaging lens 1 is conceptually illustrated. An optical path conversion prism for bending the optical path by 90 degrees is provided on the image side of the imaging lens 1, and an imaging device 10 is cemented onto the image-side surface of the optical path conversion prism 5. The imaging device 10 is arranged in such a manner that the imaging plane of the imaging device 10 matches with the image surface of the imaging lens 1. The imaging device 10 images an optical image formed by the imaging lens 1, and outputs electrical signals. Since the structure in which the optical path is bent, as illustrated in FIG. 27, is adopted, it is possible to structure a straight-view-type observation optical system in the lower half of the hard leading end portion 110, and to structure a treatment tool insertion channel 11 in the upper half of the hard leading end portion 110. Therefore, it is possible to arrange many elements in the insertion unit having a small diameter.

Figure 28:
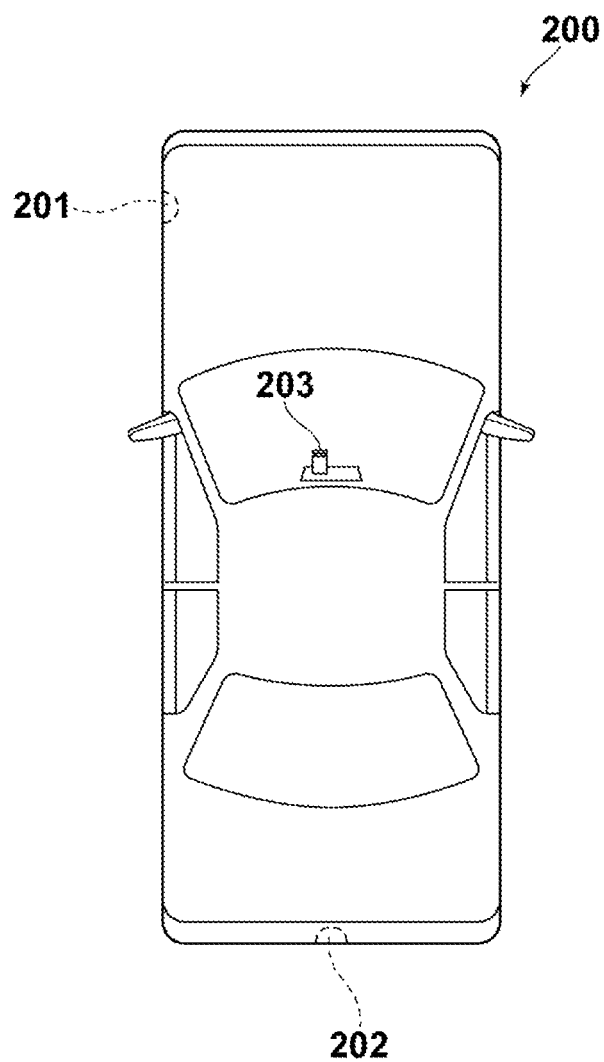
FIG. 28 is a diagram for explaining the arrangement of imaging apparatuses for in-vehicle use according to an embodiment of the present invention.

FIG. 28 is related to a camera for in-vehicle use, which is another example of an imaging apparatus. FIG. 28 illustrates a manner of mounting a camera for in-vehicle use in a car 200. The camera for in-vehicle use includes the imaging lens of the present embodiment, and an imaging device that images an optical formed by the imaging lens and outputs electrical signals. In FIG. 28, the car 200 includes an exterior camera 201 for imaging a driver's blind spot on a side of a seat next to the driver, an exterior camera 202 for imaging a driver's blind spot on a rear side of the car 200, and an interior camera 203 for imaging the same range as the driver's visual field. The interior camera 203 is attached to the back side of a rearview mirror.

So far, the present invention has been described by using embodiments and examples. However, the present invention is not limited to the aforementioned embodiments nor examples, and various modifications are possible. For example, values of a curvature radius, a distance between surfaces, a refractive index, an Abbe number and the like of each lens element are not limited to the values in the aforementioned examples of numerical values, but may be other values.

In the embodiment of the imaging apparatus, cases in which the present invention is applied to an endoscope and an in-vehicle camera were illustrated in the drawings and described. However, application of the present invention is not limited to such a purpose. For example, the present invention may be applied to a camera for a mobile terminal, a surveillance camera, and the like.

What is claimed is:

1. An imaging lens consisting of six lenses in four groups, wherein a first lens, a first cemented lens composed of a second lens and a third lens cemented together, a fourth lens, and a second cemented lens composed of a fifth lens and a sixth lens cemented together are arranged in this order from an object side, and wherein the first lens has a plano-concave shape or a meniscus shape with a concave image-side surface, and negative refractive power, and wherein one of the second lens and the third lens in the first cemented lens has positive refractive power and an other one of the second lens and the third lens has negative refractive power, and wherein the fourth lens has positive refractive power, and an object-side surface of the fourth lens is a flat surface or a surface with a curvature radius, and an absolute value of the curvature radius of the object-side surface of the fourth lens being greater than an absolute value of a curvature radius of an image-side surface of the fourth lens, and wherein one of the fifth lens and the sixth lens in the second cemented lens has positive refractive power and an other one of the fifth lens and the sixth lens has negative refractive power, and wherein a stop is arranged between the first cemented lens and the fourth lens, and wherein the following formulas (1) through (3) are satisfied:

$$1.80 < Bf/f \leq 2.533 \qquad (1);$$

$$0.15 < N1n - N1p \leq 0.239 \qquad (2); \text{ and}$$

$$0.0 < \nu1n - \nu1p < 10.0 \qquad (3), \text{ where}$$

Bf: a back focus of the imaging lens (a length in air),
f: a focal length of the imaging lens,
N1n: a refractive index of the negative lens in the first cemented lens for d-line,
N1p: a refractive index of the positive lens in the first cemented lens for d-line,
$\nu1n$: an Abbe number of the negative lens in the first cemented lens for d-line, and
$\nu1p$: an Abbe number of the positive lens in the first cemented lens for d-line.

2. An imaging apparatus comprising:
the imaging lens, as defined in claim 1; and
an imaging device that images an optical image formed by the imaging lens and outputs electrical signals.

3. An imaging lens consisting of six lenses in four groups, wherein a first lens, a first cemented lens composed of a second lens and a third lens cemented together, a fourth lens, and a second cemented lens composed of a fifth lens and a sixth lens cemented together are arranged in this order from an object side, and wherein the first lens has a plano-concave shape or a meniscus shape with a concave image-side surface, and negative refractive power, and wherein one of the second lens and the third lens in the first cemented lens has positive refractive power and an other one of the second lens and the third lens has negative refractive power, and wherein the fourth lens has positive refractive power, and an object-side surface of the fourth lens is a flat surface or a surface with a curvature radius, and an absolute value of the curvature radius of the object-side surface of the fourth lens being greater than an absolute value of a curvature radius of an image-side surface of the fourth lens, and wherein one of the fifth lens and the sixth lens in the second cemented lens has positive refractive power and an other one of the fifth lens and the sixth lens has negative refractive power, and wherein a stop is arranged between the first cemented lens and the fourth lens, and wherein the following formula is satisfied:

$$0.0 < \nu1n - \nu1p < 10.0 \qquad (3), \text{ where}$$

$\nu1n$: an Abbe number of the negative lens in the first cemented lens for a d-line of 587.7 nm, and
$\nu1p$: an Abbe number of the positive lens in the first cemented lens for the d-line of 587.7 nm.

4. An imaging apparatus comprising:
the imaging lens, as defined in claim 3; and
an imaging device that images an optical image formed by the imaging lens and outputs electrical signals.

5. The imaging lens, as defined in claim 3, wherein an F-line is 486.1 nm and a C-line is 656.3 nm.

* * * * *